United States Patent
Ohara et al.

(10) Patent No.: US 10,058,082 B2
(45) Date of Patent: Aug. 28, 2018

(54) FISHING REEL

(71) Applicant: Globeride, Inc., Tokyo (JP)

(72) Inventors: Takeshige Ohara, Tokyo (JP); Masashi Fujioka, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/336,318

(22) Filed: Oct. 27, 2016

(65) Prior Publication Data
US 2017/0079256 A1 Mar. 23, 2017

Related U.S. Application Data

(63) Continuation of application No. 14/324,851, filed on Jul. 7, 2014, now Pat. No. 9,510,575, which is a (Continued)

(30) Foreign Application Priority Data

Aug. 27, 2010 (JP) .................................. 2010-191455
Jun. 21, 2011 (JP) .................................. 2011-137425

(51) Int. Cl.
  *A01K 89/01* (2006.01)
  *A01K 89/015* (2006.01)

(52) U.S. Cl.
  CPC ...... *A01K 89/011223* (2015.05); *A01K 89/01* (2013.01); *A01K 89/015* (2013.01);
  (Continued)

(58) Field of Classification Search
  CPC .......... A01K 89/0108; A01K 89/01081; A01K 89/01082; A01K 89/01083; A01K 89/011221; A01K 89/011223
  See application file for complete search history.

(56) References Cited

U.S. PATENT DOCUMENTS 5,152,539 A * 10/1992 Takii ..................... F16C 33/765
                                                    277/347
5,238,254 A    8/1993 Takii et al.
(Continued)

FOREIGN PATENT DOCUMENTS

JP   01-203768   8/1989
JP   01-229116   9/1989
(Continued)

OTHER PUBLICATIONS

Japanese Office Action dated Mar. 12, 2015 for Appln. No. 2014-091335.
(Continued)

*Primary Examiner* — Emmanuel M Marcelo
(74) *Attorney, Agent, or Firm* — Pillsbury Winthrop Shaw Pittman, LLP

(57) ABSTRACT

Various embodiments provide a fishing reel having a lightweight, compact and easy-to-assemble magnetic seal mechanism which allows greater freedom in material selection of the rotating member. A fishing reel according to one embodiment comprises a rotating body rotatably supported via a ball bearing and a magnetic seal mechanism for sealing the ball bearing. In one aspect, the magnetic seal mechanism comprises a magnet disposed in parallel with either a magnetic inner or outer ring of the ball bearing, and magnetic fluid disposed between the magnet and said inner or outer ring, magnetic fluid being retained by a magnetic circuit formed therebetween to seal space defined between the magnet and said inner or outer ring.

13 Claims, 28 Drawing Sheets

Related U.S. Application Data continuation of application No. 13/219,203, filed on Aug. 26, 2011, now Pat. No. 8,844,856.

(52) U.S. Cl.
CPC ...... *A01K 89/0108* (2013.01); *A01K 89/0111* (2013.01); *A01K 89/011221* (2015.05)

(56) References Cited

U.S. PATENT DOCUMENTS

| 8,382,022 | B2 | 2/2013 | Shibata et al. | |
|---|---|---|---|---|
| 2003/0209621 | A1 | 11/2003 | Maeda et al. | |
| 2012/0048981 | A1 | 3/2012 | Ohara et al. | |
| 2015/0115087 | A1* | 4/2015 | Ohara | F16C 32/0406 242/223 |
| 2016/0032979 | A1* | 2/2016 | Nagata | A01K 89/01122 384/446 |

FOREIGN PATENT DOCUMENTS

| JP | 01-149066 | 10/1989 |
|---|---|---|
| JP | 11-276042 | 10/1999 |
| JP | 2002-084934 | 3/2002 |
| JP | 2002-345367 | 12/2002 |
| JP | 2002-354971 | 12/2002 |
| JP | 2003-319742 | 11/2003 |
| JP | 2007-209357 | 8/2007 |
| JP | 2010-166890 | 8/2010 |
| JP | 2013-000097 | 1/2013 |
| JP | 2013000097 A * | 1/2013 |

OTHER PUBLICATIONS

Japanese Office Action dated Jan. 22, 2015 for Appln. No. 2014-076735.
Japanese Office Action dated Apr. 30, 2015 for Appln. No. 2014-076735.
Japanese Rejection Decision dated Sep. 17, 2015 for Appln. No. 2014-091335.
Japanese Office Action dated Mar. 20, 2014 for Appln. No. 2010-191455.
Taiwanese Office Action dated Mar. 24, 2014 for Appln. No. 100130473.
Chinese Office Action dated Dec. 9, 2013 for Appln. No. 201110249779.7.
Chinese Office Action dated Apr. 23, 2013 for Appln. No. 201110249779.7.
Japanese Office Action dated May 23, 2013 for Appln. No. 2010-191455.
Non-Final Office Action Korean Patent Application No. 10-2011-0079037 dated Nov. 16, 2017 with English translation.

* cited by examiner

FISHING REEL

CROSS-REFERENCE TO RELATED APPLICATIONS

This application is a continuation of U.S. application Ser. No. 14/324,851, filed Jul. 7, 2014, which is a continuation of U.S. application Ser. No. 13/219,203, filed Aug. 26, 2011, now U.S. Pat. No. 8,844,856, which in turn is based upon and claims the benefit of priority from prior Japanese Patent Application Nos. 2010-191455, filed Aug. 27, 2010 and 2011-137425, filed Jun. 21, 2011, the entire contents of all applications are incorporated herein by reference in their entireties.

BACKGROUND

The present invention relates to a fishing reel having a seal mechanism for sealing a supporting structure which rotatably supports a rotating member.

Typical fishing reels are configured to wind up a fishing line on a spool via a power transmission mechanism by virtue of a rotating operation of a handle. Such power transmission mechanisms tend to be provided with a driving shaft configured to rotate in response to a rotation of a handle. A typical driving shaft is rotatably supported on a reel body via ball bearings.

Conventional reel bodies are susceptible to unwanted adhesion of foreign objects such as seawater or sand when they are used at a fishing site. Those foreign objects penetrate inside a reel body through gaps of the body and adhere to the ball bearings supporting the driving shaft, which causes the ball bearings to corrode and also degrades the rotation performance of the ball bearings.

In order to address the aforementioned deficiencies, it is common to attach elastic seal members onto the outer surface of the driving shaft in proximity to the ball bearings to make the ball bearings both waterproof and dustproof. However, the contact pressure from such elastic seal members onto the driving shaft causes the rotation performance of the driving shaft to degrade.

There is known a structure designed to ensure waterproof and dustproof capability of the ball bearing without degrading the rotation performance of the driving shaft. For example, Japanese Patent Application Publication 2003-319742 discloses a magnetic seal mechanism for sealing a reel body by retaining magnetic fluid between a magnetic holdings ring forming a magnetic circuit and a spool shaft (driving shaft).

However, the above-mentioned magnetic seal mechanism is configured to include a magnet which is sandwiched between a pair of polar plates. That configuration requires two plates for a single magnet, thus resulting in increased number of components and resulting poorer production efficiency due to more complicated assembly process. In addition, it is difficult to make the reel body compact since the body needs to have a large size of installation space corresponding to the sum of the thickness of the magnet and the pair of the plates at least at one end of the bearing. Moreover, the specific weight of the plates is as high as that of iron because the plates are made of a magnetic material, which causes greater total weight of the magnetic seal mechanism.

In addition, the afore-mentioned magnetic seal mechanism is configured such that the magnetic fluid is in direct contact with the rotating member of the driving shaft, which requires the rotating member to be made of a magnetic material. Accordingly, there are limited numbers of available options in selecting the material of the rotating member that can satisfy the desired quality requirement. Furthermore, the resulting rotating member made of a magnetic material leads to a greater weight of the entire reel.

The above-described magnetic seal mechanism may apply not only to the driving shaft rotatable in response to a rotation of a handle but also to various portions of a bearing supporting member disposed on the reel. For example, the magnetic seal mechanism may be applied to bearing portions which conventionally do not employ such a magnetic seal mechanism, such as a bearing for rotatably supporting a line roller configured to guide a fishing line to a spool. However, in case that the magnetic seal mechanism is applied to the bearing configured to support a line roller, a high-speed rotation of the rotor exerts a large centrifugal force on the line roller and its bearing and the centrifugal force causes the magnetic fluid of the magnetic seal mechanism to fly off. Although a stronger magnetic force may prevent the fly-off of the magnetic fluid, it would become necessary to increase the size of the magnet to achieve such a stronger magnetic force. Such an increased size of the magnet inevitably results in a larger size and a greater weight of the entire reel and also causes ill-balanced rotation of the rotor.

SUMMARY

Various embodiments of the present invention provide a fishing reel having a light-weight, compact and easy-to-assemble magnetic seal mechanism which allows greater freedom in material selection of the rotating member. Other embodiments of the present invention provide a fishing reel which can prevent magnetic fluid from flying off due to a rotation of a rotor even when the magnetic fluid is applied to a liner roller bearing.

A fishing reel according to one embodiment of the present invention comprises a rotating body rotatably supported via a ball bearing and a magnetic seal mechanism for sealing the ball bearing. In one aspect, the magnetic seal mechanism comprises a magnet disposed in parallel with either a magnetic inner or outer ring of the ball bearing, and magnetic fluid disposed between the magnet and said inner or outer ring, magnetic fluid being retained by a magnetic circuit formed therebetween to seal space defined between the magnet and said inner or outer ring.

According to this embodiment, the magnetic seal mechanism does not include the polar plates which are employed by conventional seal mechanisms and the magnetic fluid is directly retained between the magnet and the outer or inner ring, thereby decreasing the number of entire components to improve assembly efficiency and production efficiency. In addition, the absence of the polar plates enables the magnetic seal mechanism to be thinner by the thickness of the conventional polar plates, thereby achieving compact body. The magnetic seal mechanisms according to the embodiment is lighter than conventional ones since it does not have magnetic polar plates with great specific weight which are employed by conventional seal mechanisms. Furthermore, the rotating body is not necessarily made of a magnetic material because the magnetic fluid is not in direct contact with the rotating member, thereby allowing greater freedom in material selection.

A fishing reel according to one embodiment of the present invention further comprises a polar plate disposed adjacent to the magnet on the opposite side of the magnet to the ball bearing. According to this embodiment, the polar plate may decrease the leakage of magnetic flux and thus increase the magnetic flux density in desired areas to improve sealing capability. Moreover, since there is a single polar plate 60 is disposed for one magnet, the magnetic seal mechanism may be lighter and more compact and as compared to conventional seal mechanisms which require two polar plates for each magnet. Furthermore, the polar plate may be manufactured more precisely and thereby obtaining constant size of gap between the magnet and the inner or outer ring (thereby preventing rattle in the radial direction, for example).

According to one embodiment of the present invention, the magnet is supported on a nonmagnetic supporting body, the supporting body including a base portion disposed adjacent to either said inner or outer ring of the ball bearing; and a supporting end portion disposed on the opposite end of the supporting body for supporting the magnet. Accordingly, the magnet is disposed only at the position necessary for sealing by use of the supporting body to facilitate the injection operation of the magnetic fluid.

According to one embodiment of the present invention, the supporting end portion is configured to be a thin outer periphery portion thinner than the base portion, and wherein the magnet is supported on a stepped portion between the base portion and the thin outer periphery portion. Thus, the magnet can be steadily supported on the stepped portion, which enables the assembly efficiency to be enhanced.

A fishing reel according to one embodiment of the present invention further includes a spool on which a fishing line is wound up, wherein said rotating body is a line roller for guiding the fishing line towards the spool. An effective sealing performance for the line roller portion which is required to be lightweight and compact is achieved.

A fishing reel according to one embodiment of the present invention further includes a receiver for receiving scattered portions of the magnetic fluid, wherein the receiver is disposed along a direction to which the magnetic fluid may fly off due to a centrifugal force within a range where a magnetic force of the magnet can act.

Thus, since the receiver is provided along the direction to which the magnetic fluid can be flied off due to the centrifugal force generated by the rotation of the rotor so that they can receive the scattered magnetic fluid, it is possible to prevent further scattering of the magnetic fluid if such scattering occurs due to the centrifugal force generated by the rotation of the rotor. In addition, since the receiver is disposed within the area where the magnetic force of the magnet can act, the portions of the magnetic fluid received by the receiver may return to the original position (i.e., the area between the side surface of the outer ring in which a magnetic circuit exists) and the magnet) by virtue of the magnetic force from the magnet as the centrifugal force decreases, thereby maintaining desired magnetic seal capability. Thus, the receiver for receiving the scattered magnetic fluid may overcome the traditional difficulties due to centrifugal force and facilitate application of magnetic seal mechanisms to the line roller.

According to one embodiment of the present invention, the receiver is formed as a part of an existing component such as a line roller. Accordingly, the receiver can be provided without adding any additional components and thus without increasing the size and weight of the reel.

According to one embodiment of the present invention, the receiver is provided on a holding member for holding the magnet. Since the receiver is formed as a part of the holding member for retaining the magnet, the distance between the magnet and the receiver can become smaller (thereby applying stronger magnetic force to the magnetic fluid retained by the receiver). Accordingly, it is possible to restrict the range where the magnetic fluid is scattered to facilitate return of the scattered magnetic fluid back from the receiver to the original position (i.e., the space between the magnet and the outer ring). In addition, the receiver can be provided without adding any additional components and thus without increasing the size and weight of the entire reel.

According to one embodiment of the present invention, the receiver is provided on a circular member which is inserted into the outer ring of the ball bearing. Thus, the receiver is formed on the circular member intervened between the line roller and the outer ring of the ball bearing for greater freedom in the geometry of the receiver around the ball bearing to deal with the situation where the magnetic fluid can be scattered in a wider area. This embodiment may be particularly favorable for fishing methods which can scatter the magnetic fluid in a wider area such as jigging where a high-speed winding action may occur while the rod is being operated.

According to one embodiment of the present invention, the magnetic fluid is retained between the magnetic and a side surface of the outer ring of the ball bearing. In this embodiment, the magnet seal mechanism can be compact since the magnetic fluid is retained between the magnet and the side surface of the outer ring of the ball bearing. According to another embodiment of the present invention, the magnetic seal mechanism and the receiver are formed integrally with the ball bearing. In this embodiment, the magnetic seal mechanism and the receiver are formed integrally with the ball bearing to facilitate the assembly of the components into the reel body, thereby achieving effective size management (management of the range where the magnetic force of the magnet 40 can act).

The above embodiments may be applied to various kinds of rotating bodies such as components rotatable in response to a rotating operation of a handle, such as a rotation driving shaft (handle shaft (driving gear shaft), pinion gear shaft, spool shaft, level winding shaft); members forming a part of bearings; members rotatable in concert with the above driving shaft (e.g., collars to be fitted internally or externally to a driving shaft or sliding shaft); and members rotatable independent of a rotating operation of a handle (e.g., line roller).

BRIEF DESCRIPTION OF THE SEVERAL VIEWS OF THE DRAWING

FIG. 19 (b) shows an enlarged cross sectional view of the portion encircled by the reference circle "D" of FIG. 18.

DETAILED DESCRIPTION

Figure 1:
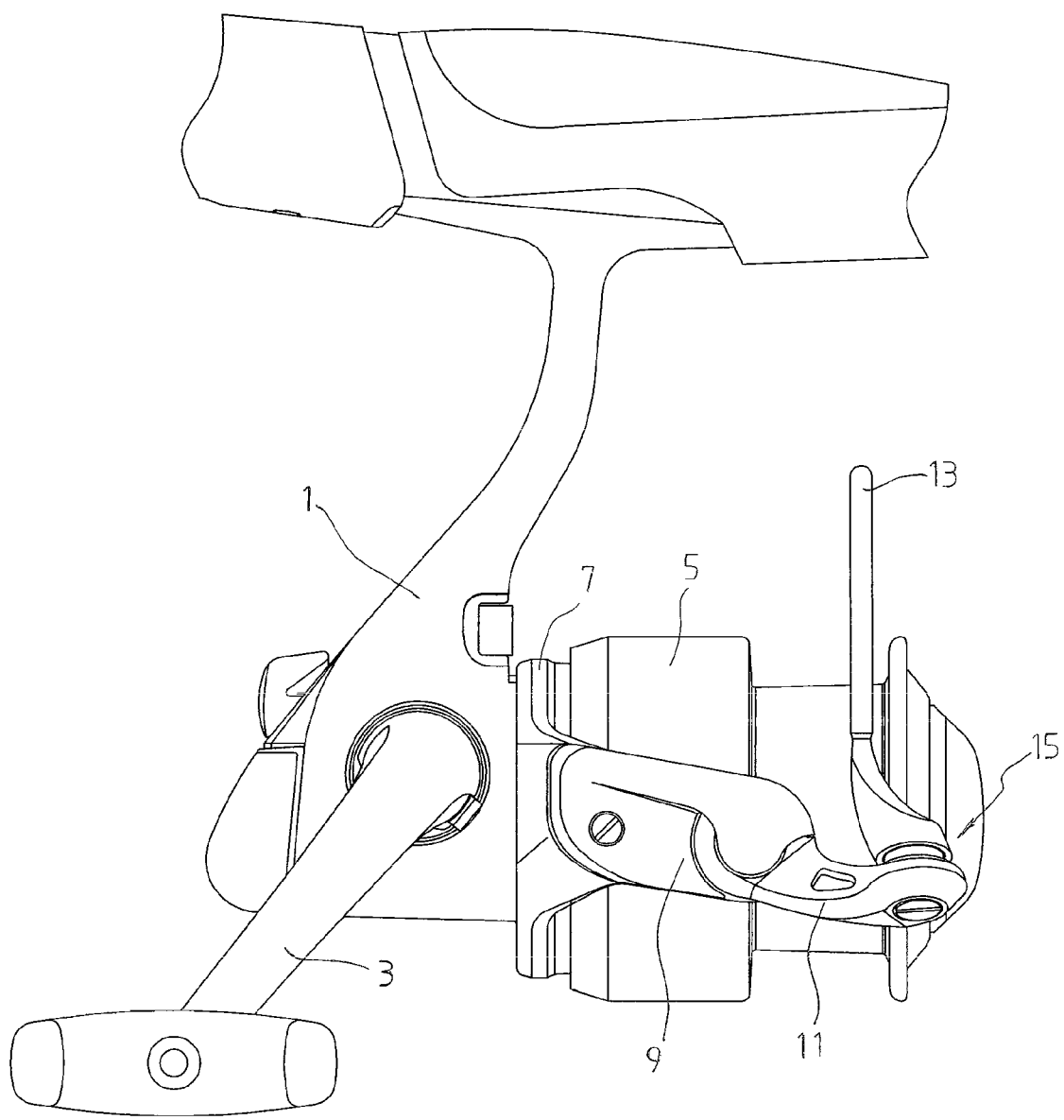
FIG. 1 shows an overall view of the fishing reel (spinning reel) according to the first embodiment of the invention.

With reference to the appended drawings, a fishing reel according to various embodiments of the invention will be described. In the drawings, similar symbols identify similar components, unless context dictates otherwise. FIGS. 1-4 depict the first embodiment of the present invention. As shown in FIG. 1, the fishing reel according to this embodiment is a spinning reel having reel body 1. Provided inside the reel body 1 is a driving gear (not shown) rotatable in response to a rotating operation of handle 3. The driving gear is meshed with a pinion (not shown) which functions as a driving shaft. A spool shaft (not shown) is inserted in the pinion along its axial direction. Rotatably mounted at the tip end of the spool shaft is spool 5 for winding up a fishing line thereon. The spool shaft is configured to reciprocate in response to a rotation of the driving gear through an oscillating mechanism (not shown) which is engaged with the driving gear.

Mounted at the tip end of the pinion is rotor 7 rotatable in concert with the pinion. The rotor 7 is provided with a pair of supporting arms 9 for supporting bail 13 via supporting member 11 such that the bail 13 can swing between a fishing line releasing position and fishing line winding position. Fishing line guide 15 is provided between the supporting member 11 and bail 13 for guiding a fishing line to the spool 5. The fishing line guide 15 will be described in more detail below.

The rotation generated by a rotating operation of the handle 3 is transmitted through the driving gear to the pinion and, in turn, rotates the rotor 7 through the pinion. The rotation of the handle 3 is also transmitted through the oscillating mechanism to the spool shaft to cause the spool 5 to reciprocate. Thus, a fishing line can be evenly wound up via the fishing line guide 15 on the spool 5.

Figure 2:
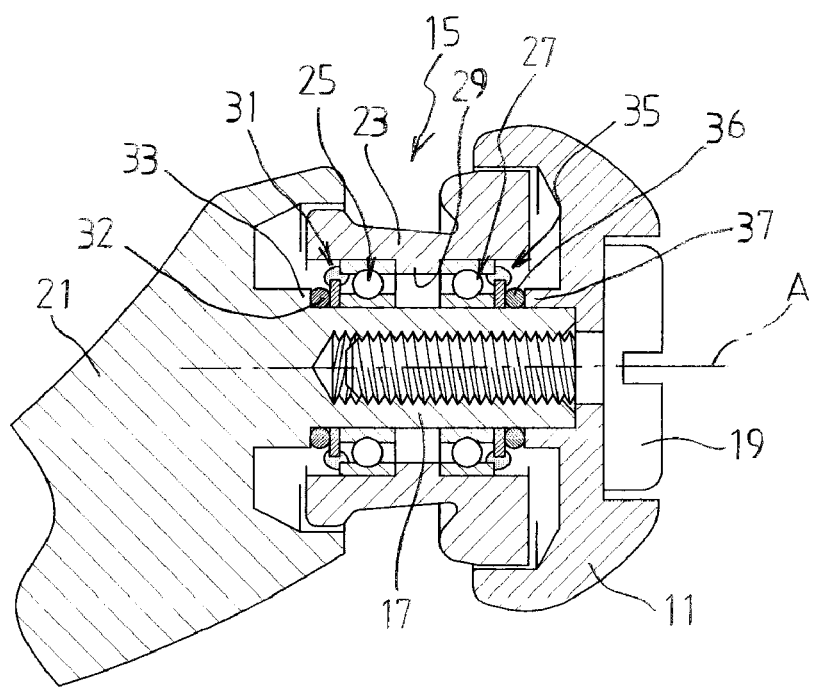
FIG. 2 shows a cross sectional view of a main part of the line roller portion of the fishing reel shown in FIG. 1.
Figure 3:
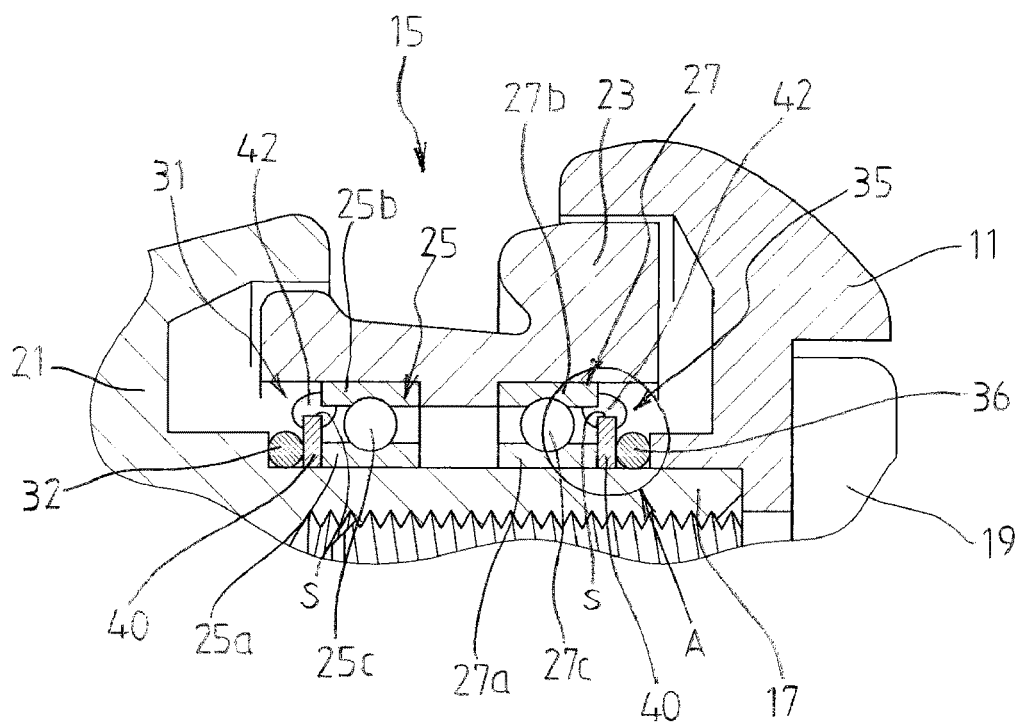
FIG. 3 shows an enlarged cross sectional view of a main part of the fishing reel of FIG. 2.

Now, with reference to FIGS. 2 and 3, the fishing line guide 15 comprises line slider 21 having supporting portion 17 which projects towards the axial direction such that it can threadingly receive screw 19 to engage the fishing line guide 15 with one of the supporting members 11. As shown, the supporting portion 17 may be formed integrally with the slider 21. In another embodiment, the supporting portion may be formed integrally with the supporting member 11.

One of the base ends of the bail 13 is attached to the line slider 21. In response to the swing movement of the bail 13 to the fishing line winding position, the fishing line is guided from the bail through the line slider 21 up to the line roller (rotating body) 23 which is one of the components forming the fishing line guide 15.

The line roller 23 is supported by the supporting portion 17 via ball bearings 25, 27 each of which is formed in circular shape. In one aspect, the line roller 23 may be formed in substantially hollow cylindrical shape and has a smoothed outer surface. With this, a fishing line is guided from the bail 13 through the line slider 21 to the line roller 23 during winding operation and then wound up on the spool 5 through the smooth outer surface of the line roller 23. It should be noted that the shape of the outer surface of the line roller is not limited to the specific shape described above.

The pair of ball bearings 25 and 27 are intervened between the inner surface of the line roller 23 and the outer surface of the supporting portion 17 and disposed apart from one another in the axial direction (the direction along the rotation axis "A" of the line roller 23). The ball bearings 25 and 27 comprise a pair of inner rings 25a and 27a fixed on the outer surface of the supporting portion 17, a pair of outer rings 25b and 27b disposed outside of the rings 25a and 27a, and a pair of rollers 25c and 27c rotatably held between the inner rings 25a, 27a and the outer rings 25b, 27b. The ball bearings 25 and 27 are sealed by a pair of magnetic seal mechanisms 31 and 35 disposed adjacent to the ball bearings 25 and 27. The seal mechanisms 31 and 35 will be described in more detail below.

Each of the facing edges (internal edges) of the pair of the ball bearings 25 and 27 bumps into engagement portion 29 projecting from the inner surface of the line roller. While the outer edge of the ball bearing 25 bumps into engaging portion 33 formed on the supporting portion 17 through the first magnetic seal mechanism 31 and O-ring 32, the outer edge of the ball bearing 27 bumps, through the second magnetic seal mechanism 35 and O-ring 36, into engaging portion 37 formed on the supporting member 11 to cover the edge of the supporting portion 17.

Thus, the pair of ball bearings 25 and 27 are maintained with its axial movement restricted by the engaging portions 29, 33, and 37. The first and second magnetic seal mechanisms 31 and 35 magnetically seal the inside of the ball bearings 25 and 27 against the outside thereof. The O-rings 32 and 36 are configured to seal either the gap between the supporting portion 17 and the ball bearings 25, 27 or the gap between the supporting portion 17 and the supporting member 11.

Figure 4:
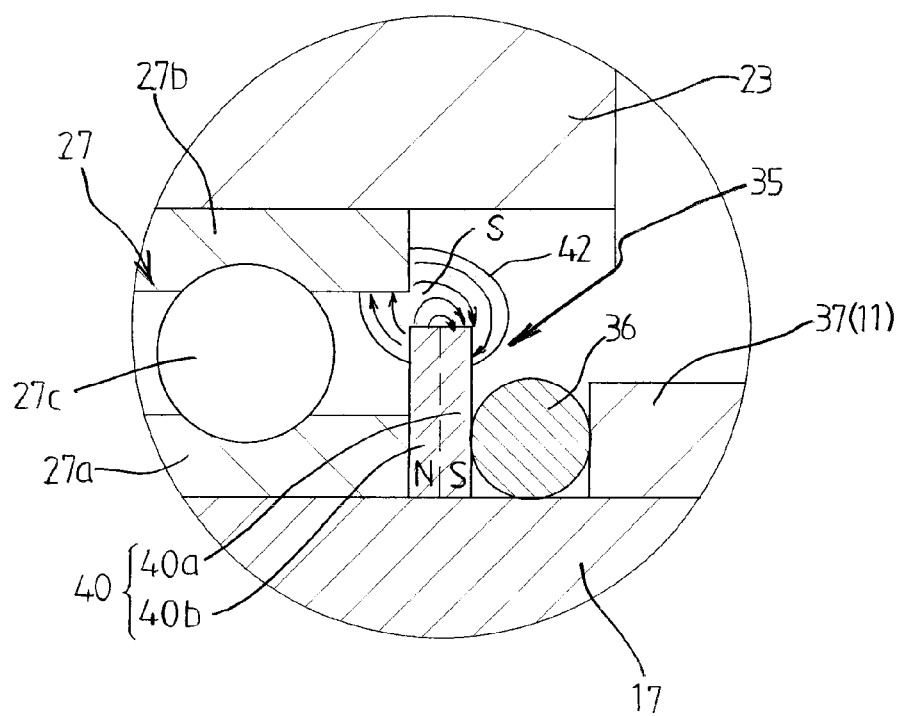
FIG. 4 shows an enlarged view of the portion denoted by the reference circle "A" of FIG. 3.

Now with reference to FIG. 3, the magnetic seal mechanisms 31 and 35 will be further described. As shown in FIG. 3, the magnetic seam mechanism 31 (35) includes magnet 40 formed in circular plate shape (and fitted on the outer surface of the supporting portion 17). The magnet is arranged in parallel and in intimate contact with the inner ring 25a (27a). In one aspect, the magnet 40 comprises, as shown in FIG. 4, first magnetic pole portion 40b which is magnetized as N-pole and faces the ball bearing 25 (27); and second magnetic pole portion 40a which is a magnetized as S-pole and disposed on the opposite side of the magnet 40. The outer diameter of the magnet 40 is smaller than the inner diameter of the outer ring 25b (27b) of the ball bearing 25, 27). As such, the gap "s" is defined between the outer edge of the magnet 40 and the outer edge of the outer ring 25b (27b). In one aspect, at least the outer ring 25b (27b) is magnetized (made of magnetic material). Thus, a magnetic circuit as denoted by the directional arrow in FIG. 4 (which represents the direction of the magnetic field line) is formed between the outer edge of the magnet 40 and the outer edge of the outer ring 25b (27b). Magnetic fluid 42 is retained in the gap "s" where the magnetic circuit is formed. That is, the magnetic fluid 42 is disposed between the magnet 40 and the outer ring 25b (27b) of the ball bearing 25 (27) and retained by the magnetic circuit formed therebetween, thereby tightly sealing the gap (space) "s" to seal the inside of the ball bearing 25 (27).

The outer ring 25b (27b) is made of a magnetic material such as an iron type material including steel, SUS430, SUS440C, SUS630 and the like. The injected magnetic fluid 42 can be made by dispersing magnetic find particles such as $Fe_3O_4$ particles in a surface acting agent and base oil. The magnetic fluid 42 is viscous fluid and made of a magnetic material and can react to a magnet. As such, the magnetic fluid 42 can be steadily retained in the gap "s" by the magnetic circuit formed between the outer edge of the magnet 40 and the outer edge of the outer ring 25b (27b), thereby tightly sealing the inside of the ball bearing 25 (27) against the outside thereof.

In this embodiment, the inner ring 25a (27a) of the ball bearing 25 (27) is preferably made of a magnetic material to magnetically connect the magnet 40 with the inner ring 25a (27a). Alternatively, the magnet 40 may be arranged in parallel and in intimate contact with the outer ring 25b (27b) of the ball bearing 25 (27) to retain the magnetic fluid 42 by the magnetic circuit formed between the magnet 40 and the magnetic inner ring 25a (27a). It is preferable to dispose the magnet 40 adjacent to the fixed inner ring 25a (27a) as shown in the Figures because a large centrifugal force may be applied to the magnetic 42 in case the magnet 40 is disposed on the outer ring 25b (27b) and as such rotates together with the line roller.

As described above, according to this embodiment, the magnetic seal mechanisms 31 and 35 do not include the polar plates which are employed by conventional seal mechanisms and the magnetic fluid 42 is directly retained between the magnet 40 and outer rings 25b and 27b (or inner rings 25a and 27a) thereby decreasing the number of entire components to improve assembly efficiency and production efficiency. In addition, the absence of the polar plates enables the magnetic seal mechanism 31 and 35 to be thinner by the thickness of the conventional polar plates, thereby achieving compact body. The magnetic seal mechanisms 31 and 35 according to the embodiment is lighter than conventional ones since it does not have magnetic polar plates with great specific weight which are employed by conventional seal mechanisms. Furthermore, the line roller 23 is not necessarily made of a magnetic material because the magnetic fluid 42 is not in direct contact with the line roller 23, thereby allowing greater freedom in material selection. The magnetic seam mechanism according to this embodiment may be formed without the O-rings 32 and 36 by increasing the amount of the magnetic fluid sufficient to fill the area otherwise occupied by the O-rings 32 and 36.

Figure 5:
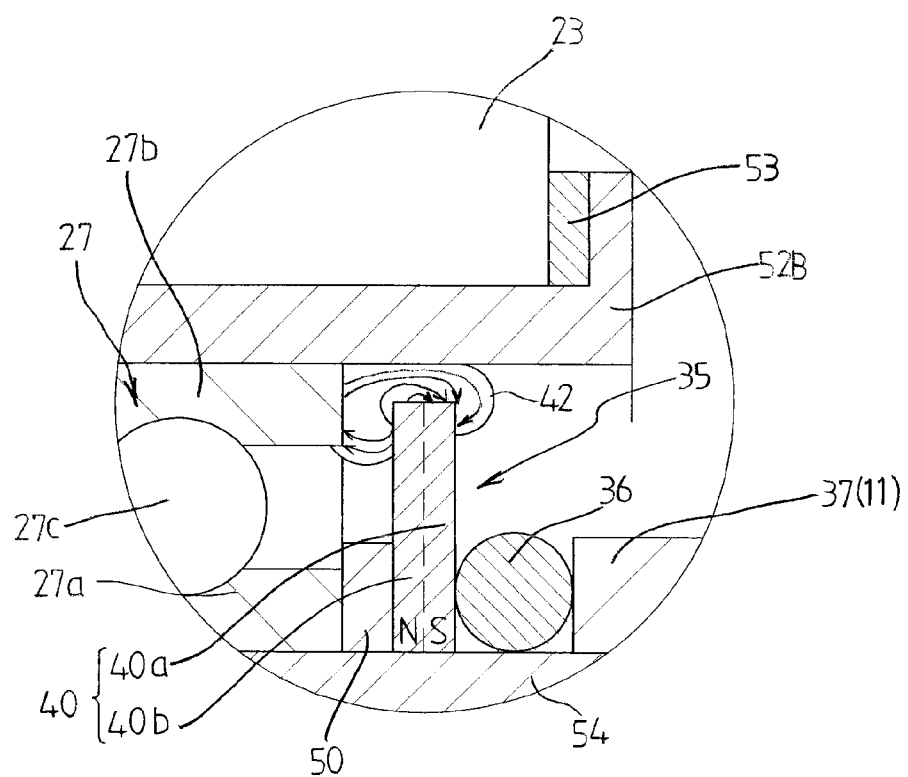
FIG. 5 shows an enlarged view of the portion denoted by the reference "B" of FIG. 7.
Figure 6:
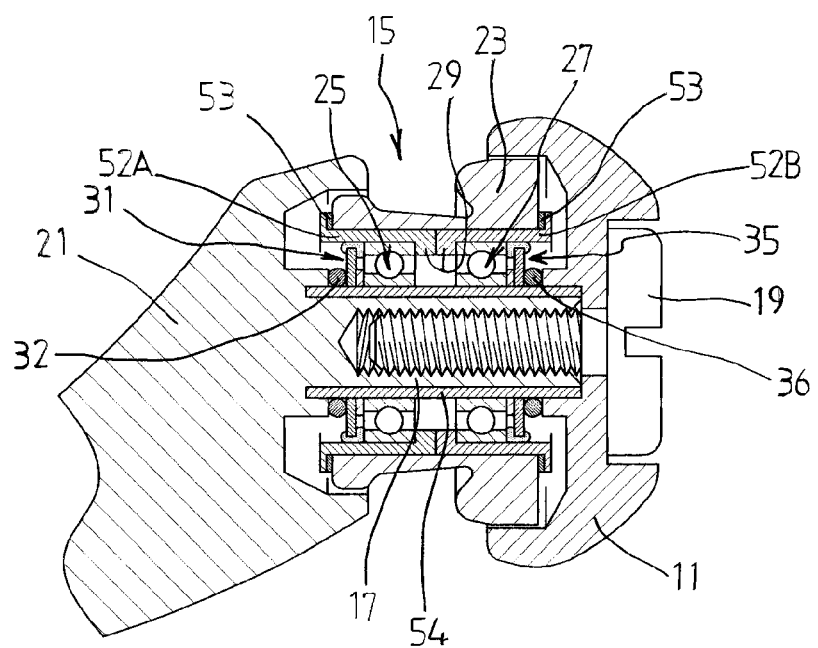
FIG. 6 shows a cross sectional view of a main part of the line roller portion of the fishing reel (spinning reel) according to the second embodiment of the invention.
Figure 7:
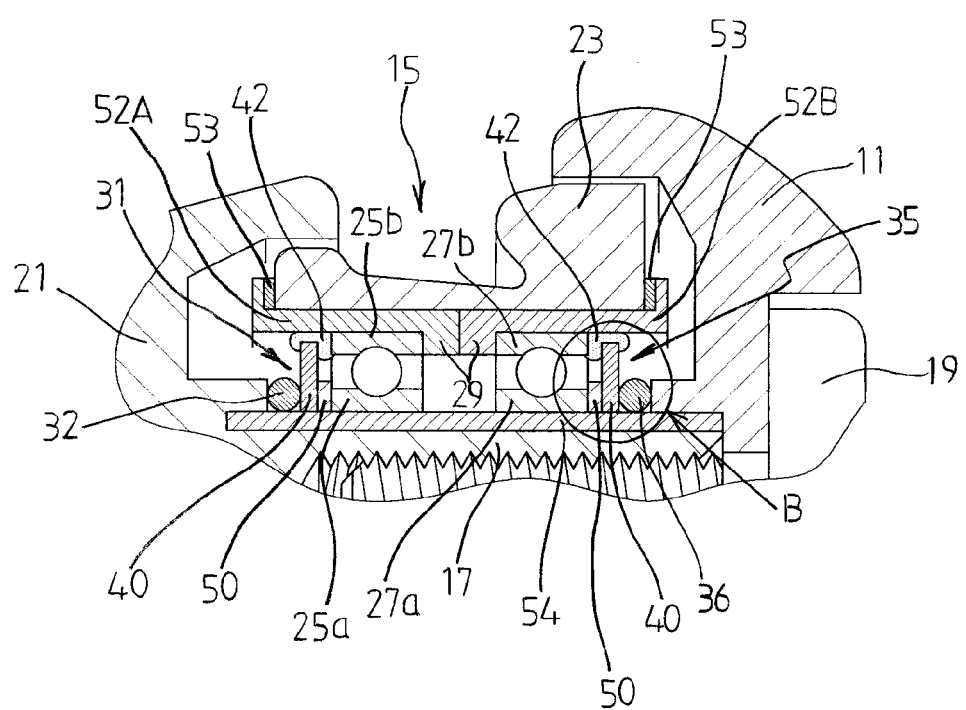
FIG. 7 shows an enlarged cross sectional view of a main part of the fishing reel of FIG. 6.

Now, with reference to FIGS. 5-7, the second embodiment of the present invention will be described. As shown, circular collars 52A and 52B made of resin are disposed between the liner roller 23 and outer ring 25b (27b) of the ball bearings 25 (27). The inner edges of the circular collars 52A and 52B are configured to face one another and to be curved into the radially internal direction to form the engagement portion 29. The external edges of the circular collar 52A and 52B are curved into the radially outer direction such that they face the side edges of the line roller 23. Disposed between the side edges of the line roller 23 and the circular collars 52A and 52B are seal components 53 such as elastic washer. The seal components 53 may prevent unwanted foreign objects such as water from penetrating inside the ball bearings 25 and 27 through the gap between the curved edges of the circular collars 52A and 52B. As compared to the first embodiment, the wider area face the outer ring of the ball bearings so that strong magnetic force may act in a wider area to tightly seal against foreign objects such as water. In this embodiment, tube member 54 is disposed between the supporting portion 17 and the inner ring 25a (27a) of the ball bearing 25.

The magnetic seal mechanisms 31 and 35 according to this embodiment comprises circular magnet 40 which is arranged in parallel with the inner ring 25a (27a). The magnet 40 comprises first magnetic pole portion 40b which is magnetized as N-pole and second magnetic pole portion 40a which is magnetized as S-pole. Disposed between the magnet 40 and the inner ring 25a (27a) is washer 50 which is preferably made of a nonmagnetic material. Thus, the magnet 40 is disposed in no direct contact with the inner ring 25a (27a). The outer diameter of the magnet 40 is greater than the inner diameter of the outer ring 25b (27b) of the ball bearing 25 (27). When magnetic fluid 42 is injected into the gap "s" defined between the outer edge of the magnet 40 and the external edge of the magnetic outer ring 25b (27b) to form the magnetic circuit (as denoted by the directional arrow in FIG. 5), the magnetic fluid 42 is retained not only in the gap between the outer edge of the magnet 40 and the external edge of the outer ring 25b (27b) but also in the gap between the outer edge of the magnet 40 and the inner surface of the circular collars 52A and 52B. Thus, the magnetic fluid 42 is disposed between the magnet 40 and the outer ring 25b (27b) of the ball bearing 25 and retained by the magnetic circuit formed in that area to seal the gap "s" defined therebetween as well as another gap defined between the outer edge of the magnet 40 and the inner surface of the circular collars 52A and 52B (i.e., sealing the gap between the outer ring 25b (27b) of the ball bearing 25 and the inner surface of the circular collars 52A and 52B) to tightly seal the inside of the ball bearing 25 (27).

Figure 8:
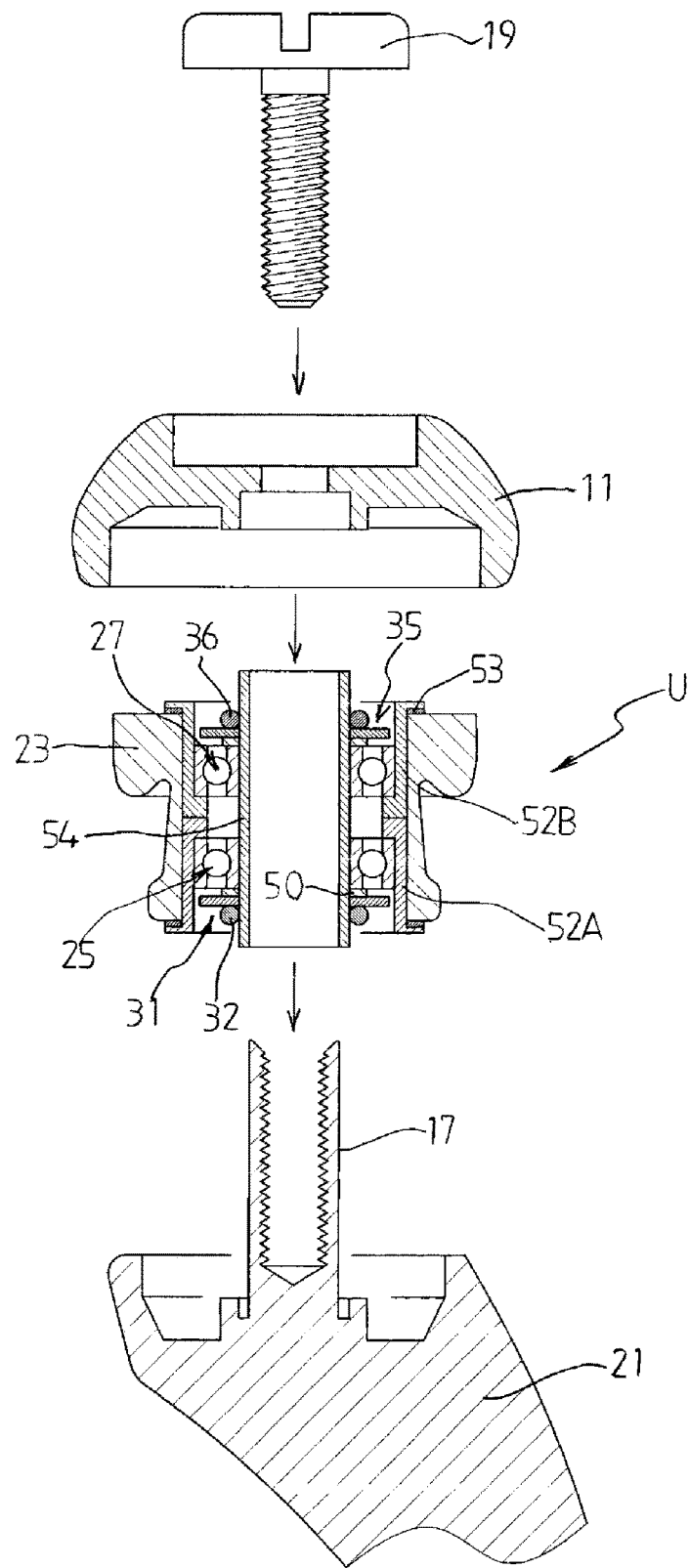
FIG. 8 shows an exploded cross sectional view illustrating an assembling method of the line roller portion.

This embodiment may achieve an additional advantageous effect that the magnetic fluid may seal a wider area. In addition, as shown in FIG. 8, there is provided a magnetically-sealed bearing assembly which comprises the ball bearings 25 and 27 as well as magnetic seal mechanisms 31 and 35 between the circular collars 52A, 52B and the tube body 54. The line roller 23 may be attached to the assembly to form an integrated unit "U". Since the unit "U" may be assembled with the line slider 21 having the supporting portion 17 and the supporting member via the screw 19 as shown in FIG. 8, efficient assembly can be achieved. As with the first embodiment, the magnet 40 may be disposed on the outer ring.

Figure 9:
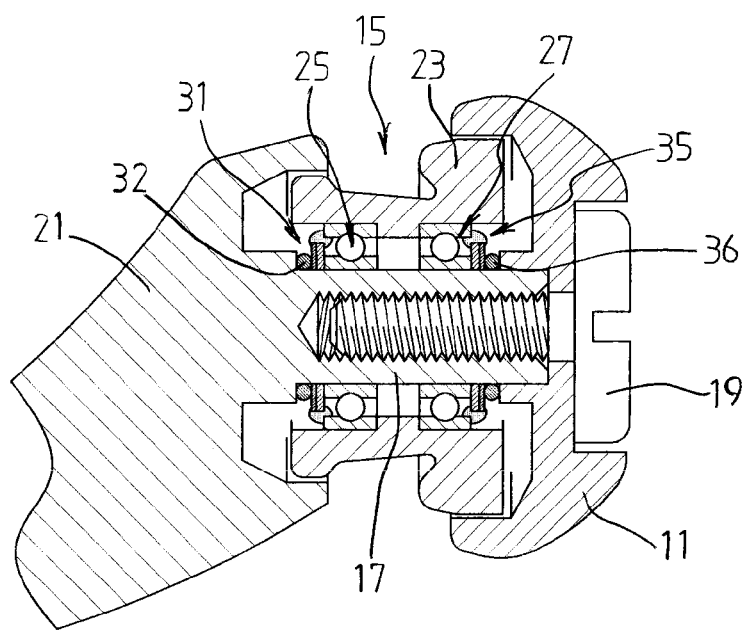
FIG. 9 shows a cross sectional view of a main part of a line roller portion of the fishing reel (spinning reel) according to the third embodiment of the invention.
Figure 10:
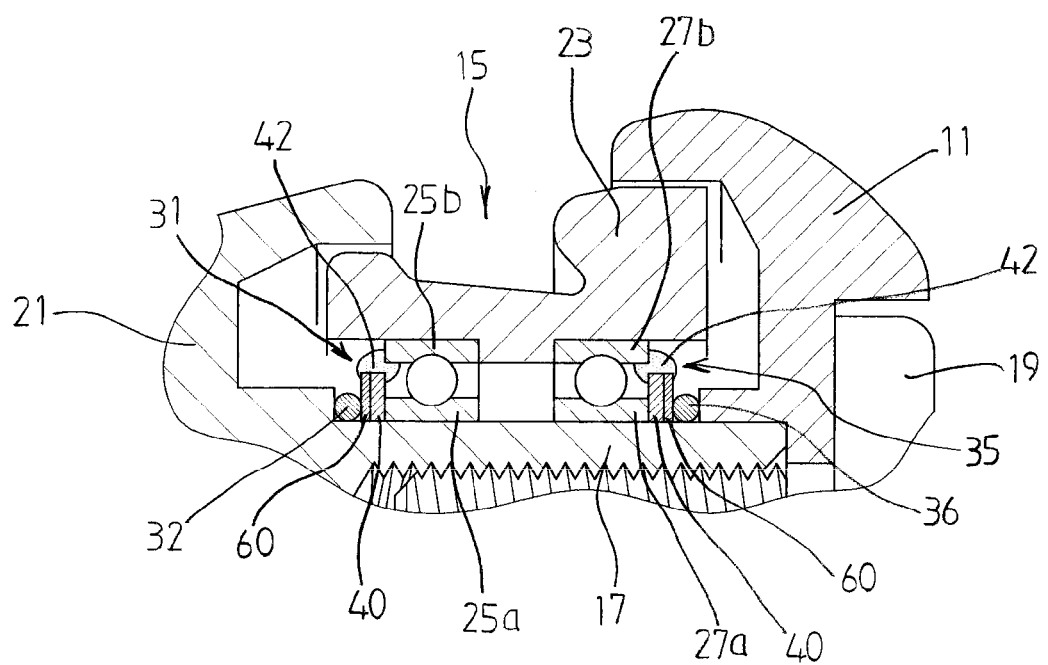
FIG. 10 shows an enlarged cross sectional view of a main part of the fishing reel of FIG. 9.

FIGS. 9 and 10 show the third embodiment of the present invention which is a modified example of the first embodiment. In this embodiment, polar bodies 60, being made of a magnetic material, are disposed between the O-rings 32, 36 and the magnets 40 of the corresponding magnetic seal mechanisms 31, 35. That is, the polar plates 60 are disposed adjacent to the corresponding magnet 40 on the opposite side to the ball bearings 31 and 35 with respect to the magnet 40. Except for those configurations, the third embodiment is configured in the same manner as the first embodiment.

In this embodiment, the polar plate may decrease the leakage of magnetic flux and thus increase the magnetic flux density in desired areas to improve sealing capability as compared to the first embodiment. Moreover, since there is a single polar plate 60 is disposed for each magnet 40 in this embodiment, the magnetic seal mechanism may be lighter and more compact as compared to conventional seal mechanisms which require two polar plates for each magnet. Furthermore, the polar plate 60 may be manufactured more precisely and thereby obtaining constant size of gap between the magnet 40 and the inner rings 25a, 27a or the size of gap between the magnet 40 and the outer rings 25b, 27b (thereby preventing rattle in the radial direction, for example).

Figure 11:
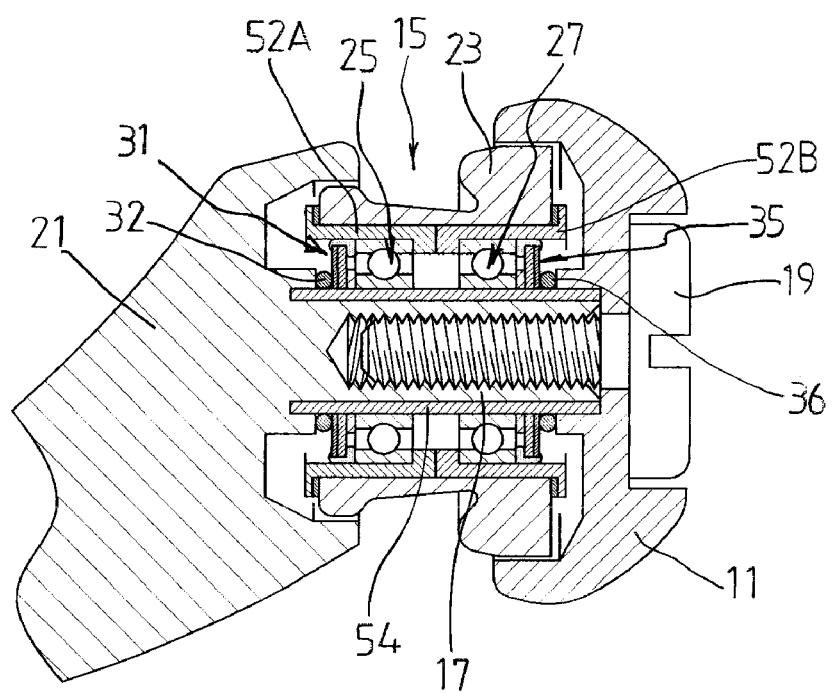
FIG. 11 shows a cross sectional view of a main part of the line roller portion of the fishing reel (spinning reel) according to the fourth embodiment of the invention.
Figure 12:
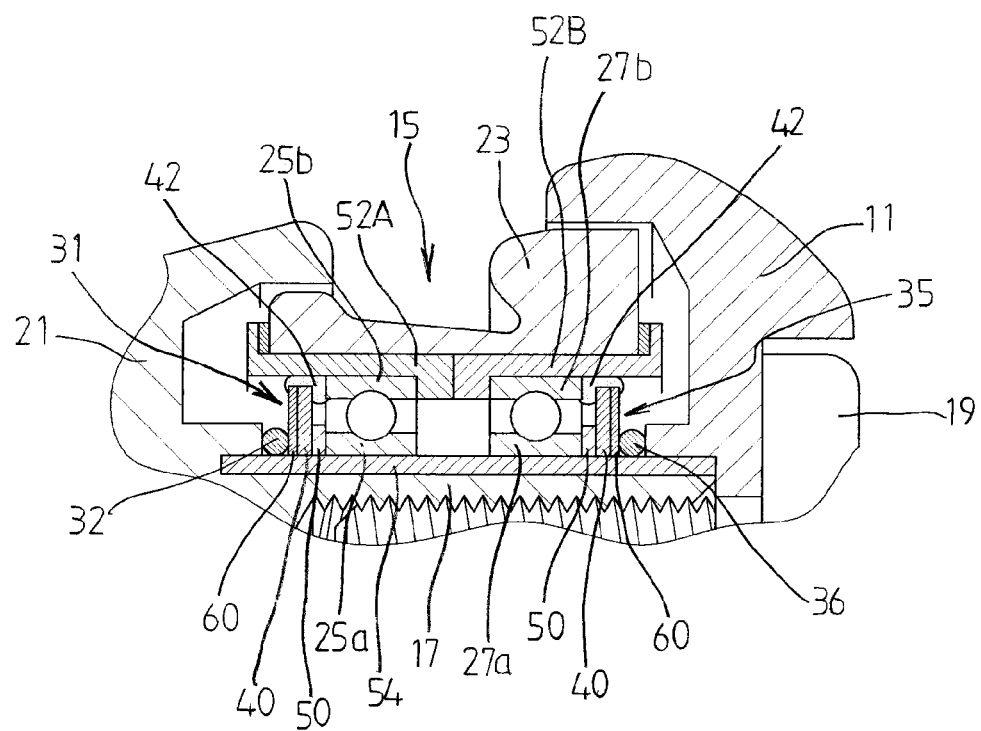
FIG. 12 shows an enlarged cross sectional view of a main part of the fishing reel of FIG. 11.

FIGS. 11 and 12 show the forth embodiment of the present invention which is a modified example of the second embodiment. In this embodiment, polar bodies 60, being made of a magnetic material, are disposed between the O-rings 32, 36 and each of the magnet 40 of the corresponding magnetic seal mechanisms 31, 35. That is, one polar plate 60 is disposed adjacent to the magnet 40 on the opposite side to the ball bearings 31 and 35 with respect to the magnet 40. Except for those configurations, the fourth embodiment as shown in FIGS. 11 and 12 is configured in the same manner as the second embodiment.

Figure 13:
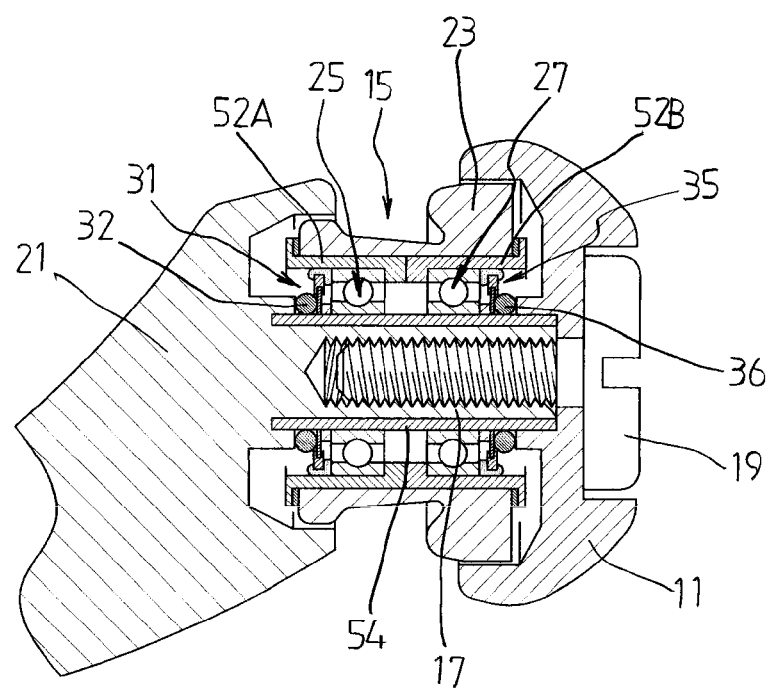
FIG. 13 shows a cross sectional view of a main part of the line roller portion of the fishing reel (spinning reel) according to the fifth embodiment of the invention.
Figure 14:
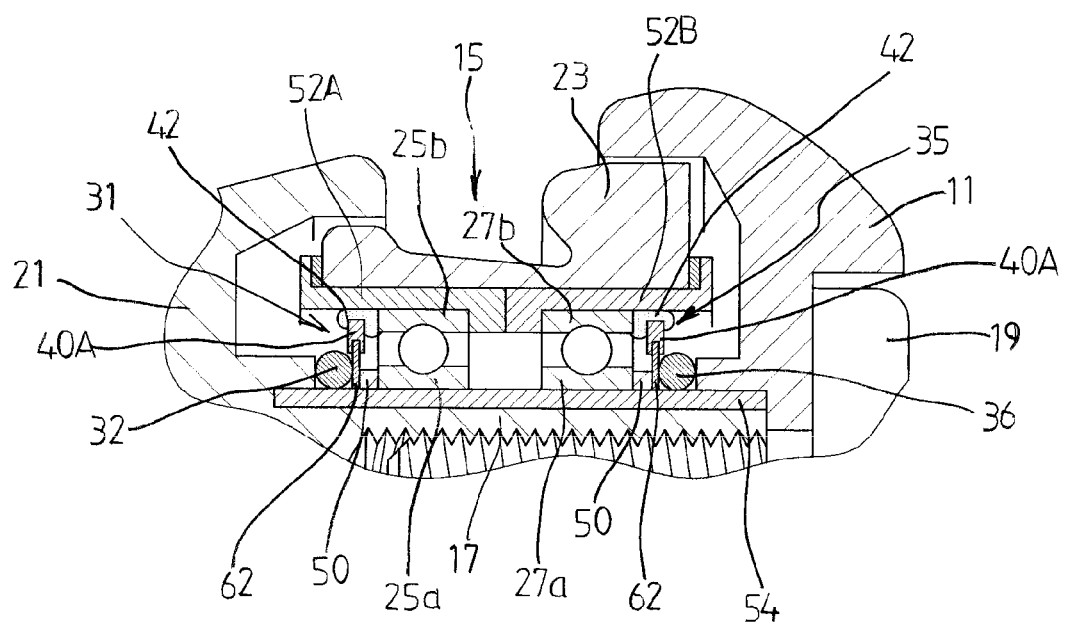
FIG. 14 shows an enlarged cross sectional view of a main part of the fishing reel of FIG. 13.

FIGS. 13 and 14 show the fifth embodiment of the present invention which is a modified example of the second embodiment. The configuration of this embodiment is substantially same as the second embodiment except for the installation of a magnet forming a magnetic seal mechanism. That is, magnet 40A according to this embodiment is supported by the edge of supporting body 62 (supporting end portion) formed in circular shape. The supporting end portion is made of a nonmagnetic material such as SUS304 or brass, and disposed adjacent to the inner ring 25a (27a) of the ball bearing 25 (27). In one aspect, the supporting body 62 comprises a base portion disposed adjacent to the inner ring 25a (27a) of the ball bearing 25 (27) and a supporting edge located at the opposite axial end of the supporting body 62 for supporting the magnet 40A. The magnet 40A is formed in circular shape and fixed to the outer surface of the supporting body 62. As with the second embodiment, the magnet 40A comprises first magnetic pole portion 40b which is magnetized as N-pole and faces the ball bearing 25 (27); and second magnetic pole portion 40a which is magnetized as S-pole and disposed on the opposite side of the magnet 40A. The outer diameter of the magnet 40A is greater than the inner diameter of the ball bearing 25 (27). As such, when the magnetic fluid 42 is injected into the gap "s" defined between the outer edge of the magnet 40A and the external edge of the magnetic outer ring 25b (27b), the magnetic fluid 42 is retained not only in the gap between the outer edge of the magnet 40A and the external edge of the outer ring 25b (27b) but also in the gap between the outer edge of the magnet 40A and the inner surface of the circular collars 52A and 52B. Accordingly, the magnetic seal mechanism of this embodiment may achieve as high sealing capability as the second embodiment. Except for those configurations, the fifth embodiment is configured in the same manner as the second embodiment. This embodiment may achieve improved production efficiency since it may be manufactured by mold injection of plastic magnet.

Thus, the magnet 40A according to this embodiment is disposed only at the position necessary for sealing by use of the supporting body 62 to facilitate the injection operation of the magnetic fluid 42. As with the first embodiment, the magnet 40A (supporting body 62) may be disposed on the outer ring.

Figure 15:
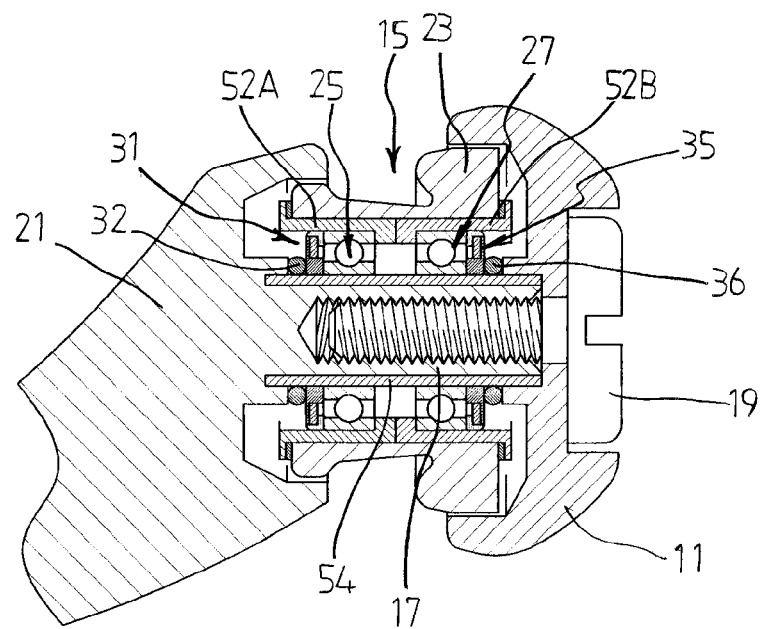
FIG. 15 shows a cross sectional view of a main part of the line roller portion of the fishing reel (spinning reel) according to the sixth embodiment of the invention.
Figure 16:
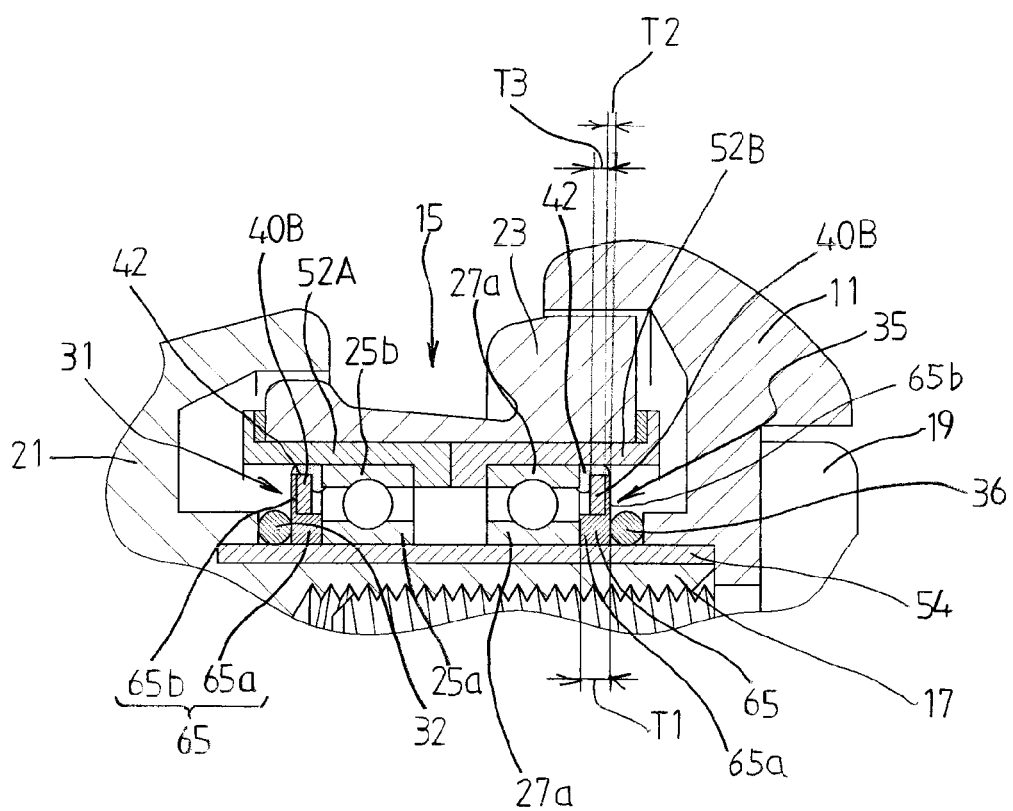
FIG. 16 shows an enlarged cross sectional view of a main part of the fishing reel of FIG. 15.

FIGS. 15 and 16 show the sixth embodiment of the present invention which is also another modified example of the second embodiment. The configuration of this embodiment is same as the second embodiment except for the installation of the magnet forming the magnetic seal mechanism. That is, magnet 40B according to this embodiment is disposed on the edge of the supporting body 65 formed in circular shape with a stepped portion. The supporting body 65 is made of a nonmagnetic material such as SUS304 or brass, and disposed adjacent to the inner ring 25a (27a) of the ball bearing 25 (27). In particular, the shape of the supporting body 65 corresponds to the shape of the supporting body 62 integrated with the washer 50 of the fifth embodiment. In one aspect, the supporting body 65 comprises base portion 65a disposed adjacent to the inner ring 25a (27a) of the ball bearing 25 (27) and an outer periphery portion (supporting edge) 65b configured to be thinner than the base portion 65a. The circular magnet 40B is disposed and supported on the stepped portion defined by the base portion 65a and the thin outer periphery portion 65b. As with the second embodiment, the magnet 40A comprises first magnetic pole portion 40b which is magnetized as N-pole and faces the ball bearing 25 (27); and second magnetic pole portion 40a which is magnetized as S-pole and disposed on the opposite side of the magnet 40A. The outer diameter of the magnet 40A is greater than the inner diameter of the ball bearing 25 (27). As such, when the magnetic fluid 42 is injected into the gap "s" defined between the outer edge of the magnet 40B and the external edge of the magnetic outer ring 25b (27b), the magnetic fluid 42 is retained not only in the gap between the outer edge of the magnet 40B and the external edge of the outer ring 25b (27b) but also in the gap between the outer edge of the magnet 40B and the inner surface of the circular collars 52A and 52B. Accordingly, the magnetic seal mechanism of this embodiment may achieve as high sealing capability as the second embodiment. Except for those configurations, the fifth embodiment is configured in the same manner as the second embodiment.

Thus, the magnet 40B according to this embodiment is disposed on the stepped portion defined by the base portion 65a and the thin outer periphery portion 65b, the magnet 40B may be steadily supported and easy to be assembled. In this embodiment the tightening force exerted during assembly is not directly applied to the magnet 40B and thereby preventing the magnet 40B from being damaged by the force. This embodiment is preferably applied to embodiments which does not comprise O-rings. That is, the configuration according to this embodiment is preferable for embodiments which employ a thin and fragile magnet (having the thickness no greater than 1.0 mm) including the embodiments shown in FIGS. 13 and 14. It is preferable to set the thicknesses T1 of the base portion 65*a*, thicknesses T2 of the think outer periphery portion 65*b*, and the thicknesses T3 of the magnet 40B such that they can satisfy the relationship represented by T1>T2+T3 in order to facilitate manual adjustment of the gap between the magnet 40B and the ball bearings 25, 27. As with the first embodiment, the magnet 40A (supporting body 62) may be disposed on the outer ring.

Figure 17:
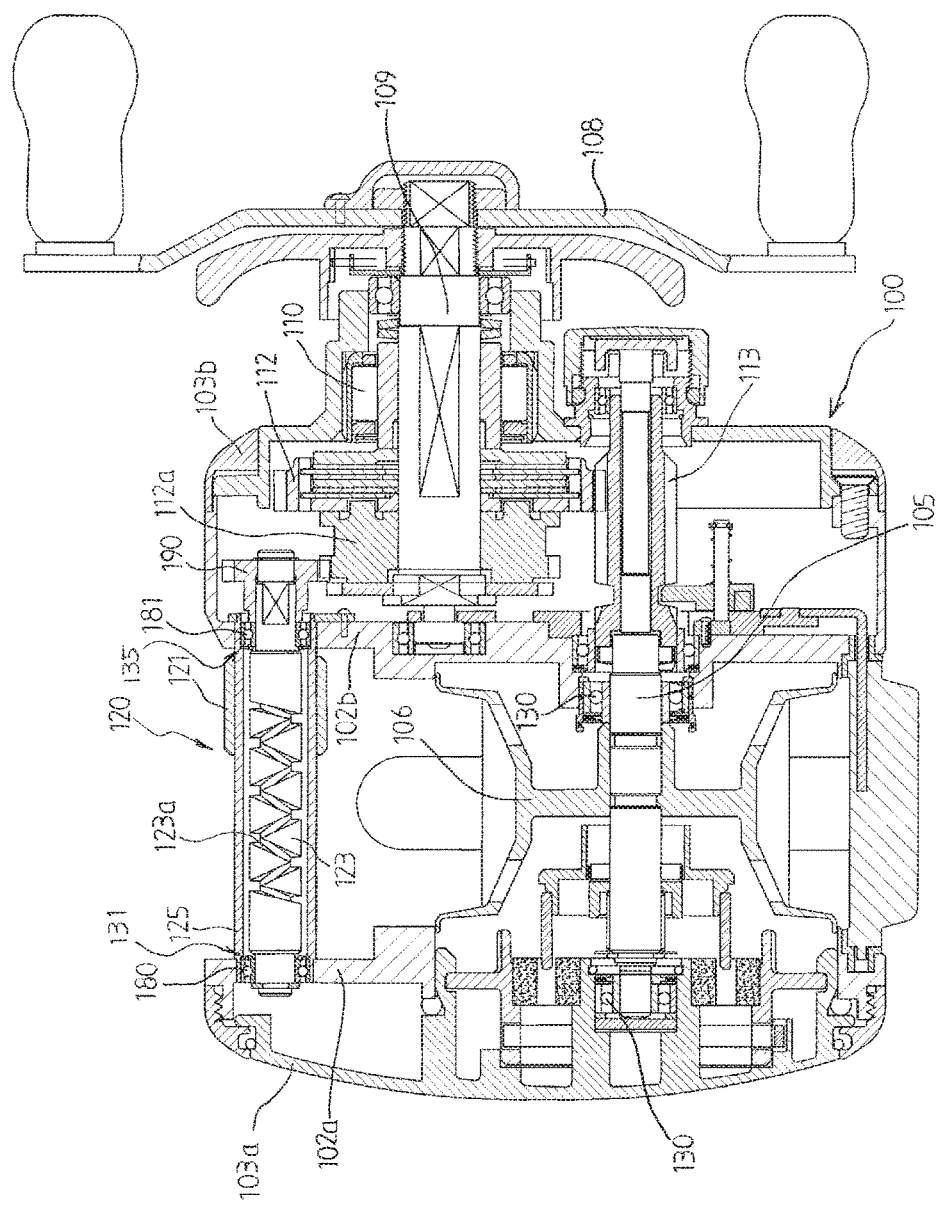
FIG. 17 shows a cross sectional view of a main part of the line roller portion of the fishing reel (spinning reel) according to the seventh embodiment of the invention.
Figure 18:
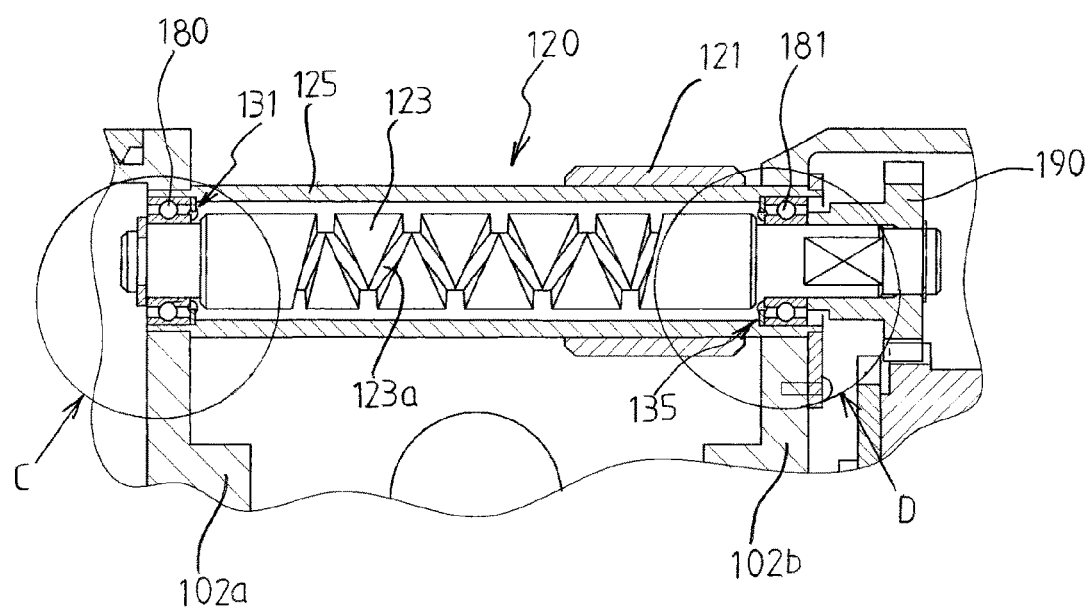
FIG. 18 shows a cross sectional view of a main part of level wind mechanism of the fishing reel of FIG. 17.
Figure 19A:
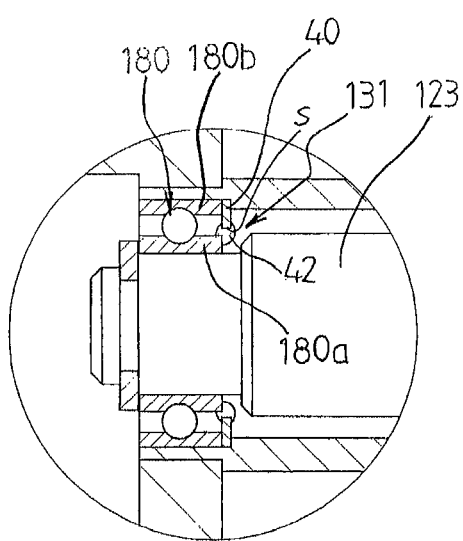
FIG. 19 (a) shows an enlarged cross sectional view of the portion denoted by the reference circle "C" of FIG. 18.
Figure 19B:
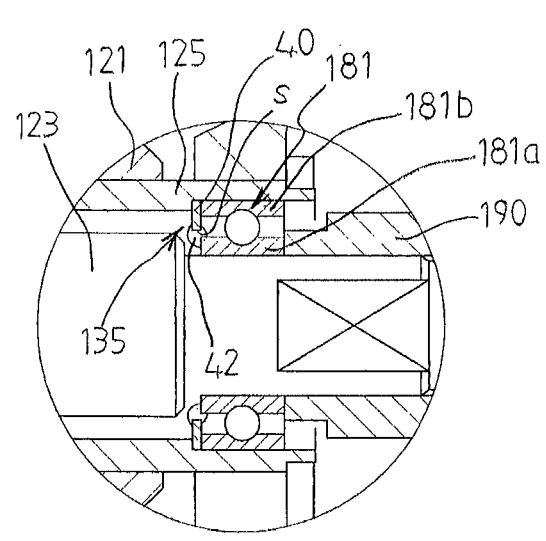

Next, with reference to FIGS. 17-19, the seventh embodiment of the present invention will be described. FIGS. 17-19 show a double-bearing fishing reel according to this embodiment. As shown, the reel body 100 of the double-bearing reel comprises left frame 102*a*, right frame 102*b* and left and right side plates 103*a* and 103*b* disposed apart from the corresponding left and right frames 102*a*, 102*b* by predetermined distances. Rotatably supported via a pair of bearings 130 between the left and right frames 102*a* and 102*b* is spool shaft 105. The spool shaft 105 serves as a driving shaft. Spool 106 is attached to the spool 105 for winding up a fishing line.

As shown, rotatably supported on the right side plate 103*b* is handle shaft 109 having handle 108. The handle shaft 109 is provided with a driving mechanism for winding up a fishing line (the "winding-up mechanism") through which a rotation operation of the handle 108 can rotate the spool 106. Provided between the handle shaft 109 and the right side plate 103*b* is one way clutch 110 which only allows the handle 109 to rotate in the winding-up direction.

The winding-up mechanism is provided with driving gear 112 rotatably mounted on the handle shaft 109 via a drag mechanism and pinion 113 meshed with the driving gear 112. The pinion 113 is rotatably supported by bearings and configured to engage and disengage with the spool shaft 105 via preferable known clutch mechanism. In the clutch-on state, the pinion 113 may transmit the rotation force generated by the handle 108 through the driving gear 112 and pinion 113 to the spool 106. On the other hand, in the clutch-off state, the pinion does not transmit the rotation force to the spool 116 to allow for free rotation of the spool 116. The switching of the clutch is carried out by operating a operation lever (not shown) projection from the reel body 100.

Provided between the left and right side plates 103*a* and 103*b* and ahead of the spool 106 is level wind mechanism 120 configured to reciprocate in the right and left direction in the anterior area of the spool 106. The level wind mechanism 120 comprises fishing line guide 121 having a through-hole through which a fishing line passes, and worm shaft 123 supported between the left and right side plates 103*a* and 103*b* formed with endless cam groove 123*a*.

The worm shaft 123 is rotatably supported between the left and right frames via ball bearings 180 and 181 and rotatably housed in cylindrical member 125 formed with a through-hole along the axial direction. An engagement pin held via the though-hole by the fishing line guide 121 is engaged with the endless cam groove so that the fishing line guide 121 can reciprocate in the right and left direction. The fishing line guide 121 is supported by a guide pillar (not shown) which is supported between the left and right frames so as not to rotate around the warm shaft 123

Mounted on one end of the worm shaft 123 adjacent to the right side plate is gear 190. The gear 190 meshes with the gear 112*a* arranged axially apart from the driving gear 112 so that it can rotate in concert with the driving gear 112. The rotation force generated upon rotation of the handle 108 is applied to the gear 190 through the handle shaft 109, driving gear 112 and gear 112*a* and the rotating force is then output to the worm shaft 123.

In this embodiment, the magnetic seal mechanisms 131 and 135 are associated with the ball bearings 180 and 181 which rotatably support the worm shaft 123 (rotating member). In particular, as shown in FIGS. 18 and 19, the magnetic seal mechanism 131 (135) is formed in substantially same shape as that of the first embodiment. The magnetic seal mechanism 131 (135) is provided with circular magnet 40 which is arranged in parallel and in intimate contact with the outer ring 180*b* (181*b*) of the ball bearing 180 (181) (fitted inside the cylindrical member 125). In one aspect, the inner diameter of the magnet 40 is greater than the outer diameter of the inner ring 180*a* (181*a*) of the ball bearing 180 (181). Accordingly, gap "s" involving a magnetic circuit is defined between the inner edge of the magnet 40 and the outer edge of the inner ring 180*a* (181*a*). The gap "s" retains the injected magnetic fluid 42. That is, the magnetic fluid 42 is disposed between the magnet 40 and the inner ring 180*a* (181*a*) of the ball bearing 180 to seal the gap (space) "s" thereby sealing the inside of the ball bearing 180 (181).

Figure 20:
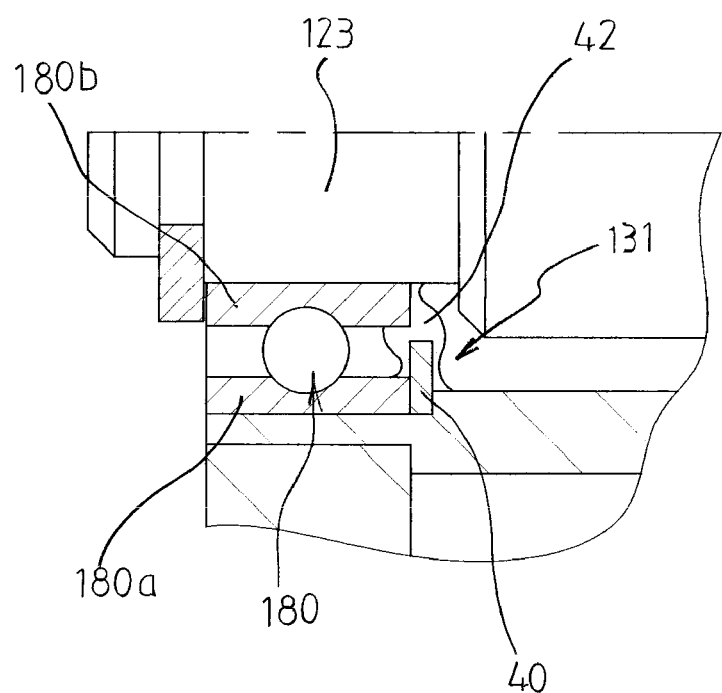
FIG. 20 shows a cross sectional view illustrating an alternative example of the portion shown in FIG. 19 (a).
Figure 21:
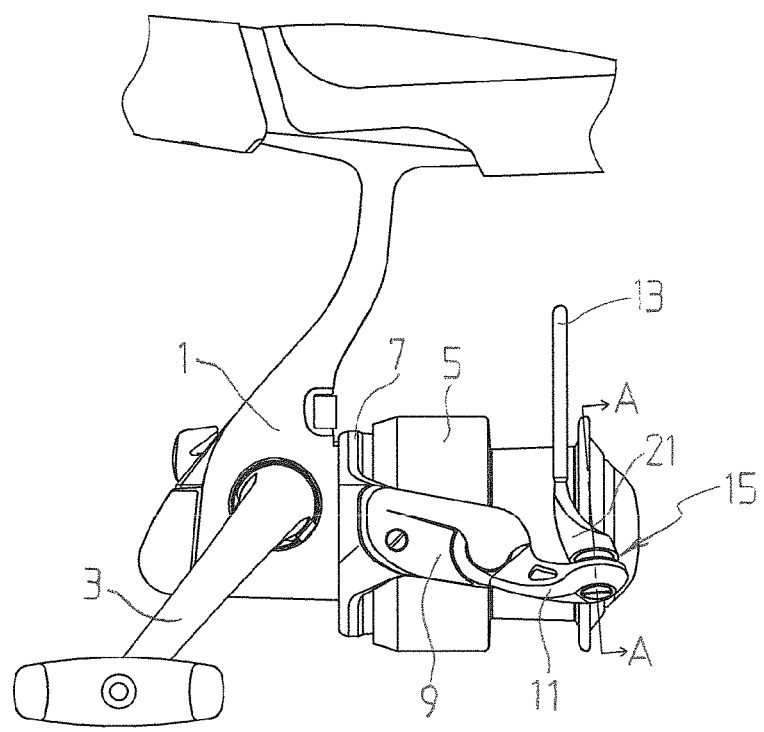
FIG. 21 shows a side view of the entire fishing reel (spinning reel) according to the eighth embodiment of the invention.
Figure 22:
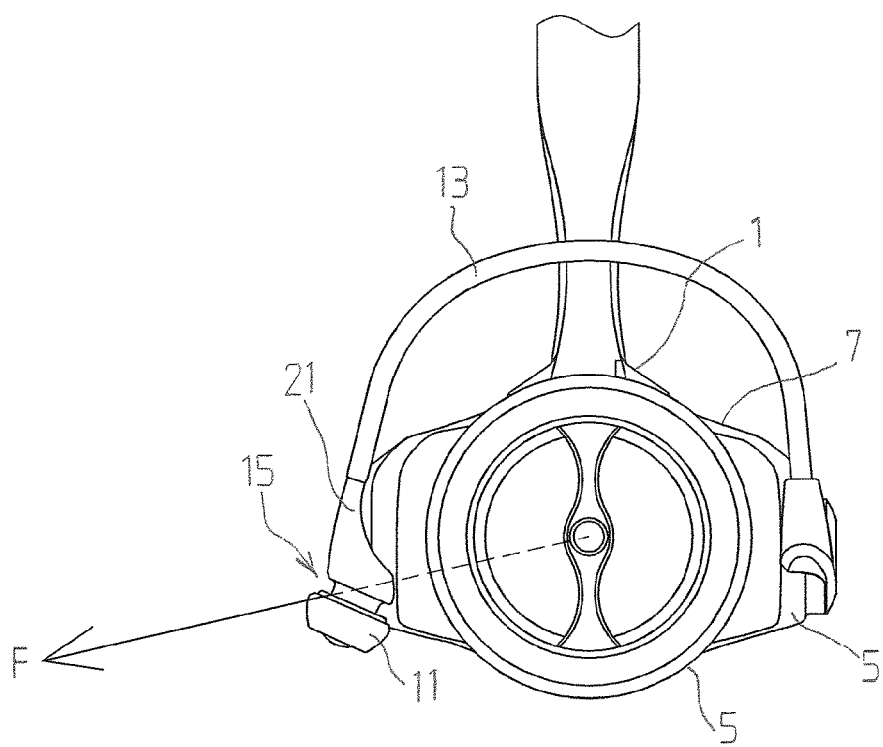
FIG. 22 shows a front elevational view of the fishing reel (spinning reel) of FIG. 21.
Figure 23:
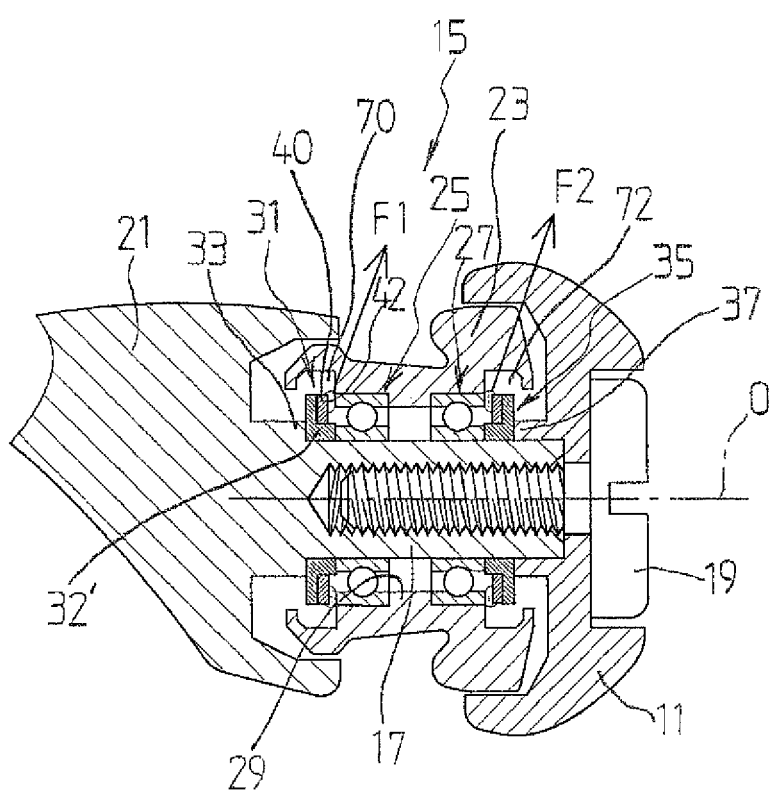
FIG. 23 shows a cross sectional view along line A-A in FIG. 21.

Thus, the magnetic seal mechanism according to this embodiment may be applied not only to the line roller 23 but also to various types of rotating bodies including the worm shaft 123 and various types of reels. As noted above in connection with the first embodiment, the greater amount of the injected magnetic fluid 42 allows a wider area to be sealed in addition to the gap "s" as shown in FIG. 20 and thereby omitting the O-rings employed in some embodiments.

Now, with reference to FIGS. 21-24, the eighth embodiment of the present invention will be described. As shown, a pair of ball bearings 25 and 27 are intervened between the inner surface of the line roller 23 and the outer surface of the supporting portion 17 and disposed apart from one another in the axial direction (the direction along the rotation axis "O" of the line roller 23). The ball bearings 25 and 27 comprises a pair of inner rings 25*a* and 27*a* fixed on the outer surface of the supporting portion 17, a pair of outer rings 25*b* and 27*b* disposed outside of the rings 25*a* and 27*a*, and a pair of rollers 25*c* and 27*c* rotatably held between the inner rings 25*a*, 27*a* and the outer rings 25*b*, 27*b*. The ball bearings 25 and 27 are sealed by a pair of magnetic seal mechanisms 31 and 35 disposed adjacent to the ball bearings 25 and 27.

Thus, the pair of ball bearings 25 and 27 are maintained with its axial movement restricted by the engaging portions 29, 33, and 37. The first and second magnetic seal mechanisms 31 and 35 magnetically seal the inside of the ball bearings 25 and 27 against the outside thereof.

Figure 24:
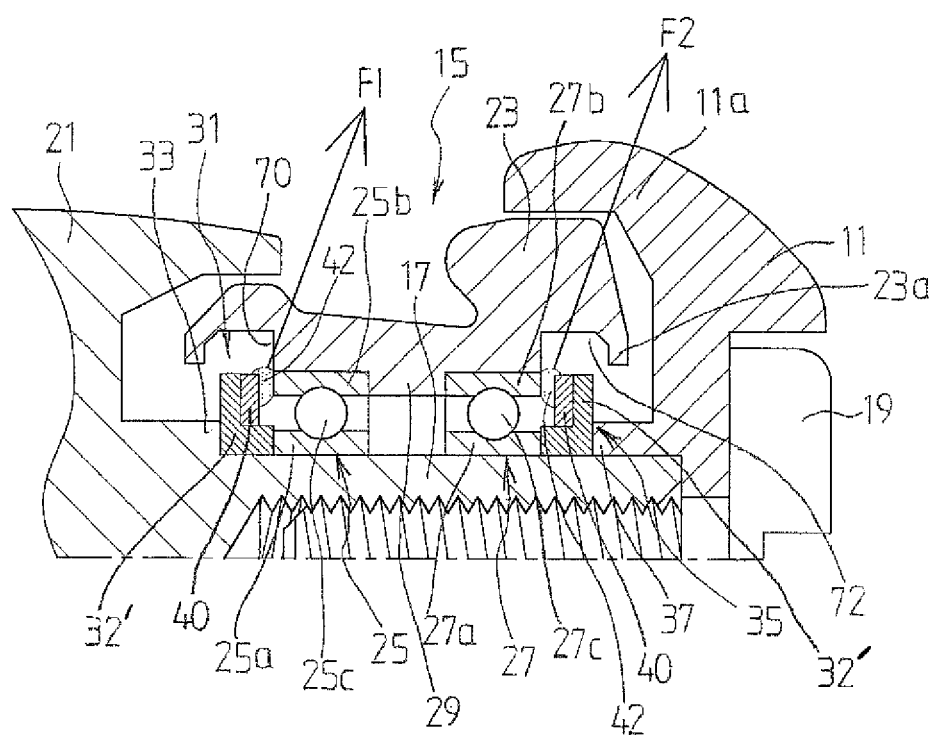
FIG. 24 shows an enlarged cross sectional view of a main part of FIG. 23.

Now, the magnetic seal mechanisms 31 and 35 will be described in more detail. As shown in FIG. 24, the magnetic seal mechanism 31 (35) includes circular holding member 32' fitted on the outer surface of the supporting portion 17. While One end of the holding member 32' bumps into stepped engagement portion 33 formed on the supporting portion 17 (or engagement portion 37 formed on the supporting member 11 and fitted on the edge of the supporting portion 17), the other end of the holding member 32' bumps into the side edge surface of the inner ring 25*a* (27*a*) of the ball bearing 25 (27). The holding member 32' retains the circular magnet 40 in parallel with the ball bearing 25 (27) via the stepped portion in its outer periphery (such that the magnet 40 faces the side surface of the outer ring 25*b* (27*b*) apart therefrom by a predetermined distance). In one embodiment, the holding member 32' may be configured to generate a magnetic area between the magnet 40 and the side surface of the magnetic outer ring 25*b* (27*b*). In this embodiment, the holding member 32' is made of a nonmagnetic material such as brass, aluminum alloy, resin, and elastic material reinforced by a metal. The ring-shaped magnet 40 is configured such that its axially internal end portion (which faces the ball bearing) is magnetized as S-pole and the its axially external end is magnetized as N-pole, thereby forming a magnetic circuit in the gap between the outer ring 25*b* (27*b*). The gap forming the magnetic circuit retains the injected magnetic fluid 42. That is, the magnetic fluid 42 is disposed between the magnetic 40 and the outer ring 25*b* (27*b*) of the ball bearing 25 (27) and retained by the magnetic circuit formed therebetween, thereby tightly sealing the gap (space) "s" to seal the inside of the ball bearing 25 (27).

In this embodiment, there are provided receivers 70 and 72 in the direction to which the magnetic fluid can be scattered due to the centrifugal force "F" (shown in FIG. 22) generated by the rotation of the rotor 7 such that the receivers 70 and 72 can receive the scattered magnetic fluid 42. The "direction to which the magnetic fluid can be scattered" includes any direction to which the magnetic fluid 42 can be flied off due to the centrifugal force "F" generated by the rotation of the rotor 7. In one aspect, the receivers 70 and 72 may be disposed on the reference line F1 and F2 (shown in FIG. 24) each of which connects the rotational center of the rotor 7 and each portion of the magnetic fluid 42 each sealing the ball bearings 25 and 27 respectively. That is, the receiver 70 associated with ball bearing 25 of the line slider 21 is disposed on the direction represented by the reference arrow F1 of FIG. 24, and the receiver 72 associated with the ball bearing 27 of the supporting member 11 is disposed on the direction represented by the reference arrow F2 of FIG. 24.

In particular, the receiver 70 may be provided by forming a groove on a desired portion of the line roller 23 opposite the magnetic fluid 42 along the direction of centrifugal force F1 so as to cover the magnetic seam mechanism 31 from its axially external side. Similarly, the receiver 72 may be provided by forming a groove on a desired portion of the line roller 23 opposite the magnetic fluid 42 along the direction of centrifugal force F2 so as to cover the magnetic seam mechanism 35 from its radially external side. The receivers 70 and 72 may be disposed in the area where the magnetic force from the magnet 40 can act. The term "the area where the magnetic force from the magnet can act" means the area where scattered magnetic fluid 42 may be attracted back to its original position (i.e., the gap between the side surface of the outer ring 25*b* (27*b*) and the magnet) assuming no centrifugal force. The range of the area may vary depending on various parameters such as the strength of the magnet 40 and the amount of the magnetic fluid 42.

In this embodiment, the radial distance between the receiver 72 of the ball bearing 27 and the center of the rotor 7 may be greater than that between the receiver 70 of the bearing 25 and the center of the rotor 7. The receiver 72 having such a greater radial distance may further include flange-shaped wall 23*a* extending around behind the magnetic seal mechanism 35 such that it can receive all of the scattered portions of the magnetic fluid 42.

Thus, since the receivers 70 and 72 are provided along the direction to which the magnetic fluid 42 can be flied off due to centrifugal force generated by the rotation of the rotor 7 so that they can receive the scattered magnetic fluid, it is possible to prevent further scattering of the magnetic fluid if such scattering occurs due to the centrifugal force generated by the rotation of the rotor. In addition, since the receivers 70 and 72 are disposed in the area where the magnetic force of the magnet 40 can act, the portions of the magnetic fluid 42 received by the receivers 70 and 72 may return to the original position (i.e., the gap between the side surface of the outer ring 25*b* (27*b*) and the magnet) by virtue of the magnetic force from the magnet 40 as the centrifugal force decreases, thereby maintaining desired magnetic seal capability. Thus, the receivers 70 and 72 for receiving the scattered magnetic fluid 42 may overcome the difficulties in conventional arts due to centrifugal force and facilitate application of magnetic seal mechanisms to the line roller 23.

Moreover, according to this embodiment, the receivers 70 and 72 can be provided without adding any additional components and thus without increasing the size and weight of the reel since the receivers 70 and 72 are formed in an integral manner with the line roller 23. Furthermore, the magnetic fluid 42 is retained between the magnet 40 and the side surface of the outer rings 25*b*, 27*b* of the ball bearings 25, 27, thereby making the magnetic seal mechanisms 31 and 35 compact.

Figure 25:
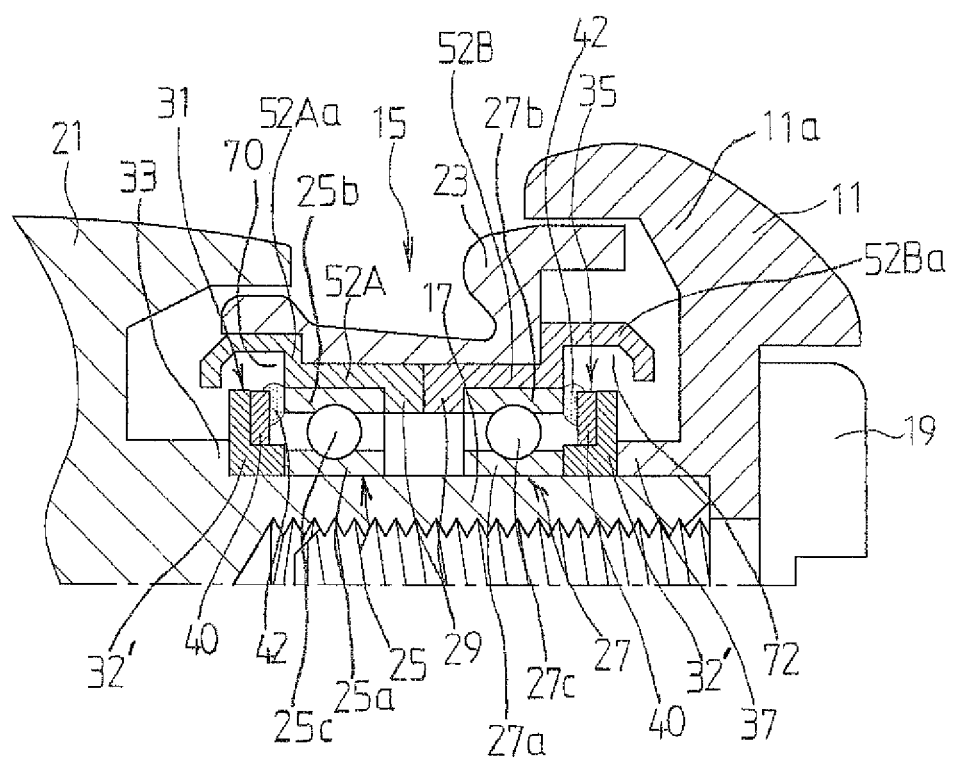
FIG. 25 shows a cross sectional view of a main part of the fishing reel (spinning reel) according to the ninth embodiment of the invention.

Now, with reference to FIG. 25, the ninth embodiment of the present invention will be described. As shown, circular collars 52A and 52B made of resin or metal are disposed between the liner roller 23 and outer ring 25*b* (27*b*) of the each of the ball bearings 25 (27). The inner edges of the circular collars 52A and 52B face one another and curved into the inner radial direction to be in contact with one another to form the engagement portion 29. The circular collars 52A and 52B are provided for alignment of the ball bearings 25 and 27 as well as the magnet seal mechanisms 31 and 35 in relation to the reel body 1. The circular collars 52A and 52B are made of either magnetic or nonmagnetic materials. The circular collars 52A and 52B are configured to rotate in concert with the line roller 23.

Furthermore, the aforementioned receivers 70 and 72 according to this embodiment may be formed in an integral manner with the circular collars 52A and 52B. In particular, the receiver 70 may be provided by forming groove (or curved concave portion) 52Aa on a portion of the circular collar 52A opposite the magnetic fluid 42 along the direction of centrifugal force F1 so as to cover the magnetic seam mechanism 31 from its radially external side. Similarly, the receiver 72 may be provided by forming groove (or curved concave portion) 52Ba on a portion of the circular collar 52B opposite the magnetic fluid 42 along the direction of centrifugal force F2 so as to cover the magnetic seam mechanism 35 from its radially external side. The receivers 70 and 72 are disposed within the range where the magnetic force from the magnet 40 can act. In addition, as noted above, it is preferable to form the receiver 72 to include a flange-shaped wall extending around behind the magnetic seal mechanism 35 such that it can receive all of the scattered portions of the magnetic fluid 42.

Thus, according to this embodiment, the receivers 70 and 72 are formed on the circular collars 52A and 52B intervened between the line roller 23 and the outer rings 25*b*, 27 of the ball bearings 25, 27 for greater freedom in the geometry of the receivers 70 and 72 around the ball bearings 25 and 27 to deal with the situation where the magnetic fluid 42 can be scattered in a wider area. This embodiment may be particularly favorable in applying to fishing methods which can scatter the magnetic fluid in a wider area such as jigging where a high-speed winding action may occur while the rod is being operated.

Figure 26:
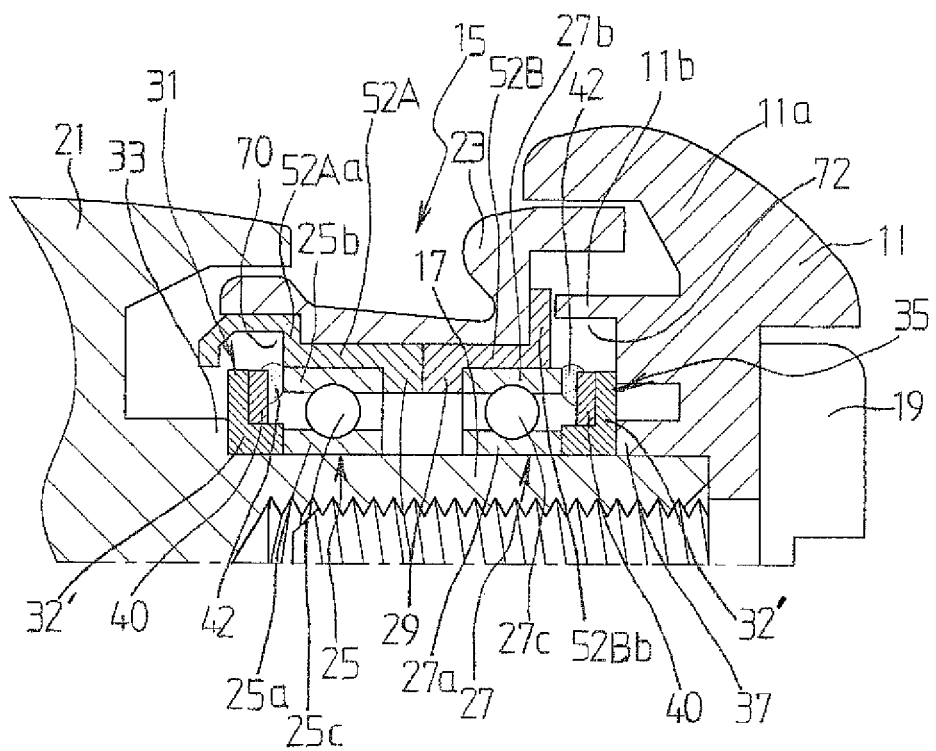
FIG. 26 shows a cross sectional view of a main part of the fishing reel (spinning reel) according to the tenth embodiment of the invention.

FIG. 26 shows the tenth embodiment of the present invention which is a modified example of the ninth embodiment. In this embodiment, the receiver 72 associated with the ball bearing 27 (for the magnetic seal mechanism 35) is formed from existing components disposed around the line roller 23. In one aspect, the receiver 72 may be formed from the non-rotating supporting member 11. In particular, the receiver 72 may be formed from extending portion 11b of the supporting member 11. The extending portion 11b may define the concave area together with the external edge 52Bb (i.e., the portion curved toward the radial outward direction along the inner surface of the line roller 23) of the circular collar 52B. The concave area is disposed opposite the magnetic fluid 42 along the direction of centrifugal force F2 such that it covers the magnetic seal mechanism 35 from the radially external side. Except for those configurations, the tenth embodiment is configured in the same manner as the ninth embodiment.

Thus, according to this embodiment, the receiver 72 is formed as a part of the existing component disposed around the liner roller such as the supporting member 11, thereby forming the receiver 72 without adding any additional components for the receiver 72 and thus forming the receiver without increasing the size and weight of the entire reel. In addition, the receiver 72 is formed as a part of the non-rotating supporting member 11, thereby securely retaining the scattered magnetic fluid.

Figure 27:
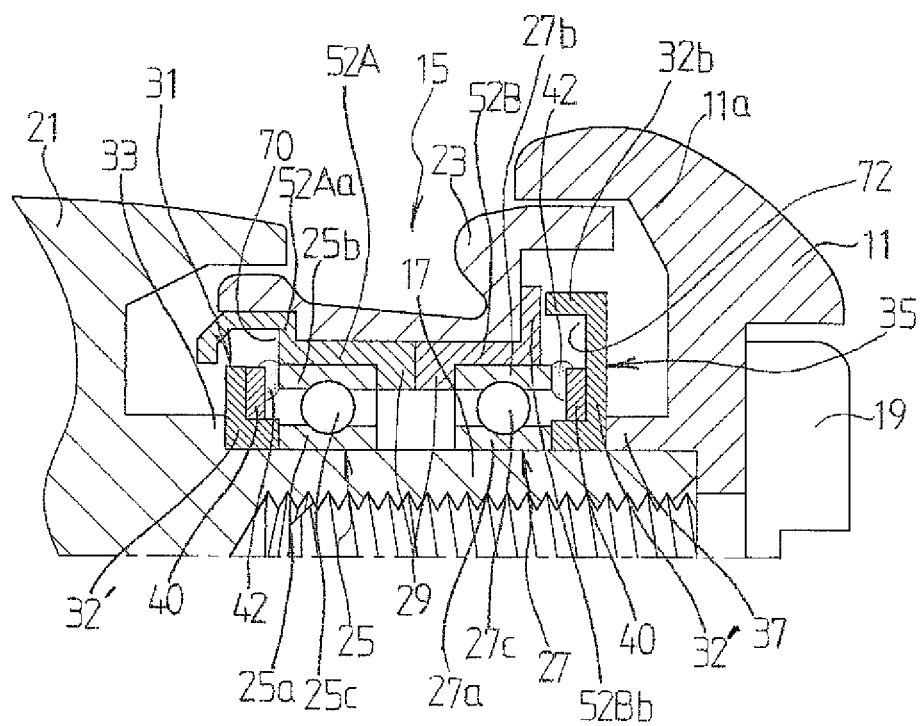
FIG. 27 shows a cross sectional view of a main part of the fishing reel (spinning reel) according to the eleventh embodiment of the invention.

FIG. 27 shows the eleventh embodiment of the present invention which is a modified example of the tenth embodiment. In this embodiment, the receiver 72 associated with the ball bearing 27 (for the magnetic seal mechanism 35) is formed with holding member 32' which is configured not to rotate. In particular, the receiver 72 may be defined by curved extending portion 32b which is configured to extend from the holding member 32' and to be curved towards the line roller 23. The curved extending portion 32b may define the concave area together with the external edge 52Bb (i.e., the portion curved toward the radial outward direction along the inner surface of the line roller 23) of the circular collar 52B. The concaved area is disposed opposite the magnetic fluid 42 along the direction of centrifugal force F2 such that it covers the magnetic seal mechanism 35 from the radially external side. Except for those configurations, the eleventh embodiment is configured in the same manner as the tenth embodiment.

Thus, according to this embodiment, since the receiver 72 is formed as a part of the holding member 32' for retaining the magnet 40, the distance between the magnet 40 and the receiver 72 can become smaller (thereby applying stronger magnetic force to the magnetic fluid 42 held by the receiver 72). Accordingly, it is possible to limit the range where the magnetic fluid 42 is scattered to facilitate return of the scattered magnetic fluid 42 back from the receiver 72 to the original position (i.e., the space between the magnet 40 and the outer rings 25b, 27b). In addition, the receiver 72 can be provided without adding any additional components and thus without increasing the size and weight of the entire reel.

Figure 28:
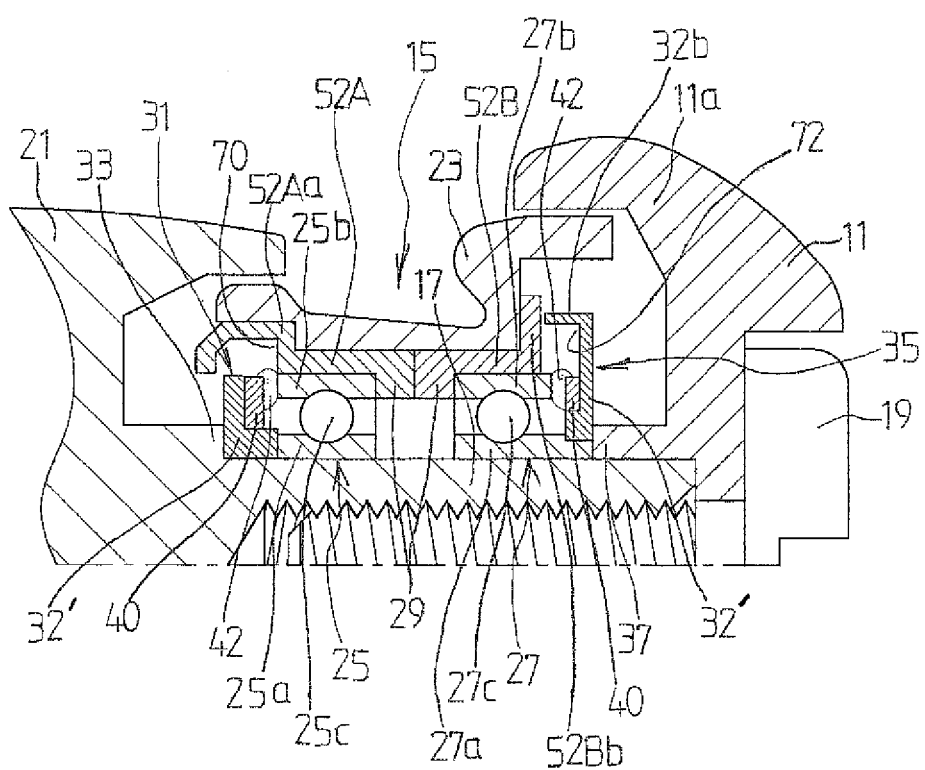
FIG. 28 shows a cross sectional view of a main part of the fishing reel (spinning reel) according to the twelfth embodiment of the invention.

FIG. 28 shows the twelfth embodiment of the present invention which is a modified example of the eleventh embodiment. In this embodiment, the holding member 32' and the magnet 40 are formed integrally with the ball bearing 27. The holding member 32' includes the curved extending portion 32b to form the receiver 72. Thus, the magnetic seam mechanism 35 and the receiver 72 are integrally fabricated with the ball bearing 27. In one aspect, the ball bearing 27 is configured such that the axial length of the inner ring 27a is greater than that of the outer ring 27b. The holding member 32' may be formed integrally with the ball bearing 27 by press-fitting the inner surface of the holding member 32' into the outer surface of the extending portion of the inner ring 27a. Thus, the alignment of the ball bearing 27 may be carried out by adjusting the position of the ball bearing so that it can come into abutting contact with the engaging portion 37 of the supporting member. Thus, the magnetic seal mechanism 35 and receiver 72 are formed integrally with the ball bearing 27 to facilitate the assembly of the components into the reel body 1. thereby achieving effective size management (management of the range where the magnetic force of the magnet 40 can act).

It should be noted that the present invention is not limited to the embodiments specifically described above but may be modified in various ways to the extent not deviating from the scope of the spirit of the invention. For example, the receiver for receiving the scattered magnetic fluid may be provided only on one side associated with one of the magnetic seal mechanisms where the magnetic fluid is more likely to fly off. In one aspect, such a single receiver may be disposed on the side associated with the magnetic seal mechanism 35 taking account into the direction to which centrifugal force may be applied. It should also be appreciated that one of the above embodiments may be combined with another embodiment. In addition, the structure of the magnetic seal mechanism is not limited to the specific embodiments as described above but any types of seal mechanism may be adopted to the extent it includes magnetic fluid. Furthermore, the position where the receivers are disposed is not limited to the positions as specifically shown in the above embodiments to the extent the receivers may receive the scattered portions of the magnetic fluid and return it back to the original position.

What is claimed is:

1. A fishing spinning reel, comprising:
a rotor rotated by rotational operation of a handle to wind a fishing line around a spool;
a line roller provided on the rotor and configured to guide the fishing line to the spool; and
a magnetic seal mechanism for sealing a bearing supporting the line roller rotatably,
wherein the magnetic seal mechanism includes a magnet disposed in parallel with the bearing, and magnetic fluid retained by a magnetic circuit formed between the magnet and an outer ring of the bearing so as to seal a space therebetween, and
a receiver for receiving scattered portions of the magnetic fluid is disposed within a range where a magnetic force of the magnet can act, along a direction to which the magnetic fluid may fly off due to a centrifugal force produced by rotation of the rotor.

2. The fishing spinning reel of claim 1, wherein the receiver is formed as a part of the line roller or an existing component around the line roller.

3. The fishing spinning reel of claim 1, wherein the receiver is provided on a holding member for holding the magnet.

4. The fishing spinning reel of claim 1, wherein the receiver is provided on an annular member inserted between the outer ring of the bearing and the line roller.

5. The fishing spinning reel of claim 1, wherein the magnetic fluid is retained between the magnet and a side surface of the outer ring of the bearing.

6. The fishing spinning reel of claim 1, wherein the magnetic seal mechanism and the receiver are formed integrally with the bearing.

7. The fishing spinning reel of claim 1 further comprising:
a support portion rotatably supporting the line roller via the bearing,
wherein the magnetic seal mechanism is configured to seal an interior of the bearing,
the bearing is held so as to be restricted from moving in an axial direction by an inner periphery of the line roller and an engagement portion formed on the support portion, and
the receiver covers the magnetic seal mechanism from a radial outside thereof.

8. A fishing spinning reel, comprising:
a rotor rotated by rotational operation of a handle to wind a fishing line around a spool;
a line roller provided on the rotor and configured to guide the fishing line to the spool;
a support portion rotatably supporting the line roller via a bearing; and
a magnetic seal mechanism for sealing an interior of the bearing,
wherein the bearing is held so as to be restricted from moving in an axial direction by an inner periphery of the line roller and an engagement portion formed on the support portion, and
a receiver for receiving scattered portions of magnetic fluid is disposed within a range where a magnetic force of a magnet of the magnetic seal mechanism can act so as to cover the magnetic seal mechanism from a radial outside thereof, the scattered portion being scattered due to a centrifugal force produced by rotation of the rotor.

9. The fishing spinning reel of claim 8, wherein the receiver is formed as a part of the line roller or an existing component around the line roller.

10. The fishing spinning reel of claim 8, wherein the receiver is provided on a holding member for holding the magnet.

11. The fishing spinning reel of claim 8, wherein the receiver is provided on an annular member inserted between an outer ring of the bearing and the line roller.

12. The fishing spinning reel of claim 8, wherein the magnetic fluid is retained between the magnet and a side surface of the outer ring of the bearing.

13. The fishing spinning reel of claim 8, wherein the magnetic seal mechanism and the receiver are formed integrally with the bearing.

* * * * *